(12) United States Patent
Suzuki

(10) Patent No.: US 8,650,444 B2
(45) Date of Patent: Feb. 11, 2014

(54) OPERATION MANAGEMENT DEVICE AND OPERATION MANAGEMENT METHOD

(75) Inventor: Toru Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 156 days.

(21) Appl. No.: 13/438,315

(22) Filed: Apr. 3, 2012

(65) Prior Publication Data

US 2012/0192008 A1   Jul. 26, 2012

Related U.S. Application Data

(63) Continuation of application No. PCT/JP2009/068850, filed on Nov. 4, 2009.

(51) Int. Cl.
*G06F 11/00* (2006.01)

(52) U.S. Cl.
USPC ............................................................ 714/37

(58) Field of Classification Search
USPC .............. 714/25–27, 30–33, 37, 38.1, 39, 40, 714/47.1, 48, 723
See application file for complete search history.

(56) References Cited

U.S. PATENT DOCUMENTS

| | | | | |
|---|---|---|---|---|
| 5,655,074 A | * | 8/1997 | Rauscher | 714/38.1 |
| 5,682,523 A | * | 10/1997 | Chen et al. | 711/3 |
| 7,747,551 B2 | * | 6/2010 | Snyder | 706/20 |
| 7,903,844 B2 | * | 3/2011 | Satonaga et al. | 382/112 |
| 8,041,541 B2 | * | 10/2011 | Buxton et al. | 702/183 |
| 2004/0044485 A1 | | 3/2004 | Kondo | |
| 2004/0138846 A1 | * | 7/2004 | Buxton et al. | 702/108 |
| 2005/0210465 A1 | | 9/2005 | Sasaki et al. | |
| 2008/0065928 A1 | | 3/2008 | Suzuki et al. | |
| 2008/0147586 A1 | | 6/2008 | Kitayama et al. | |
| 2009/0271354 A1 | | 10/2009 | Kitayama et al. | |

FOREIGN PATENT DOCUMENTS

| | | |
|---|---|---|
| JP | 2002-55717 | 2/2002 |
| JP | 2004-101203 | 4/2004 |
| JP | 2005-63332 | 3/2005 |
| JP | 2005-266916 | 9/2005 |
| JP | 2006-268208 | 10/2006 |
| JP | 2008-65668 | 3/2008 |
| JP | 2008-90762 | 4/2008 |
| JP | 2008-225681 | 9/2008 |

OTHER PUBLICATIONS

International Preliminary Report on Patentability mailed Jun. 21, 2012 issued in corresponding International Patent Application No. PCT/JP2009/068850.

(Continued)

*Primary Examiner* — Nadeem Iqbal
(74) *Attorney, Agent, or Firm* — Staas & Halsey LLP

(57) ABSTRACT

An operation management device includes a collecting unit to receive management data of elements provided in a plurality of management target devices, an analyzing unit to obtain a dependency relation of problematic data defined as data of devices with occurrence of the problem in the received management data according to definition information which defines a dependency relation between the elements and to obtain a dependency relation of non-problematic data defined as data of the devices with non-occurrence of the problem in the received management data according to the definition information, and a comparing unit to obtain management data of a common element by comparing the problematic data with the non-problematic data and to extract a difference between the problematic data and the non-problematic data with respect to management data of elements dependent on the common element.

9 Claims, 27 Drawing Sheets

(56) References Cited

OTHER PUBLICATIONS

International Search Report for PCT/JP2009/068850 mailed Feb. 2, 2010.

Ryutaro Ichise, et al. "Learning of Alignment Rules between Concept Hierarchies" Transactions of the Japanese Society for Artificial Intelligence, vol. 17, No. 3 F, pp. 230-238 (2002).

\* cited by examiner

FIG. 1

THE FOLLOWING EVENTS OCCURRED

| NO. | NODE | ... | TIME STAMP | SEVERITY | COMMENT |
|---|---|---|---|---|---|
| 1 | PARTITION#1 | ... | 8/11/08 3:44PM | NOTICE | THE NODE IS NO LONGER AVAILABLE |

SELECTION AND SUMMARY

○ ☑ INFORMATION (0)    ○ ☑ WARNING (1)    ● ☑ ALERT/ERROR (0)

[ OK ]    [ HELP ]

FIG. 2

| | DATE (FROM) | NODE | + | MESSAGE TEXT | MODULE | ERROR | WEIGHT | COMPONENT | USER | PID |
|---|---|---|---|---|---|---|---|---|---|---|
| ⊙ | 8/11/08 4:10 PM | RHEL4... | 0 | 10.XXX.XX.75:ENTERPRISE SPECIFIC TRAP(.1100)UPTIME:... | SNMPTR... | 0 | INFO | | ROOT | 2284... |
| ⊙ | 8/11/08 4:10 PM | RHEL4... | 0 | 10.XXX.XX.75:LINK UP TRAP(0)UPTIME:0:00:15.05,IF-MI... | SNMPTR... | 0 | INFO | | ROOT | 2284... |
| ○ | 8/11/08 4:10 PM | RHEL4... | 0 | RECEIVED SNMPV1 TRAP:~TYPE:LINK UP~DETAILS:COMM... | WSA | 0 | WARNING | SVS SNMP... | ROOT | 37... |
| ○ | 8/11/08 4:10 PM | RHEL4... | 0 | RECEIVED SNMPV1 TRAP:~TYPE:LINK UP~DETAILS:COMM... | WSA | 0 | WARNING | SVS SNMP... | ROOT | 35... |
| ○ | 8/11/08 4:10 PM | RHEL4... | 0 | RECEIVED SNMPV1 TRAP:~TYPE:LINK UP~DETAILS:COMM... | WSA | 0 | WARNING | SVS SNMP... | ROOT | 33... |
| ⊙ | 8/11/08 4:10 PM | RHEL4... | 0 | 10.XXX.XX.75:LINK UP TRAP(0)UPTIME:0:00:15.05,IF-MI... | SNMPTR... | 0 | INFO | | ROOT | 2284... |
| ⊙ | 8/11/08 4:10 PM | RHEL4... | 0 | 10.XXX.XX.75:LINK UP TRAP(0)UPTIME:0:00:15.05,IF-MI... | SNMPTR... | 0 | INFO | | ROOT | 2284... |
| ⊙ | 8/11/08 4:10 PM | RHEL4... | 0 | RECEIVED SNMPV1 TRAP:~TYPE:~DETAILS:~SEVERITY.INFO... | WSA | 0 | INFO | SVS SNMP... | ROOT | 3266... |
| ⊙ | 8/11/08 4:10 PM | RHEL4... | 0 | 10.XXX.XX.75:COLD START TRAP(0)UPTIME:0:00:00.00 | SNMPTR... | 0 | INFO | | ROOT | 2284... |

FIG. 5

| PACKAGES | | | | | |
|---|---|---|---|---|---|
| PACKAGE | NODE | SYNOPSIS | CATEGORY | ARCHITECTURE | VERSION |
| DEVICE-MAPPER | PD-RHEL4U4 | DEVICE MAPPER LIBRARY | SYSTEM ENVIRONMENT/B... | IA64 | 1.02.07 |
| GAWK | PD-RHEL4U4 | THE GNU VERSION OF THE AWK TEXT PROCESSING UTILITY. | APPLICATIONS/TEXT | IA64 | 3.1.3 |
| SYSVINIT | PD-RHEL4U4 | PROGRAMS WHICH CONTROL BASIC SYSTEM PROCESSES. | SYSTEM ENVIRONMENT/B... | IA64 | 2.85 |
| LHA | PD-RHEL4U4 | AN ARCHIVING AND COMPRESSION UTILITY FOR LHARC FORMAT A... | APPLICATIONS/ARCHIVING | IA64 | 1.14I |
| DIFFUTILS | PD-RHEL4U4 | A GNU COLLECTION OF DIFF UTILITIES. | APPLICATIONS/TEXT | IA64 | 2.8.1 |
| PRCTL | PD-RHEL4U4 | UTILITY TO PERFORM PROCESS OPERATIONS | APPLICATIONS/SYSTEM | IA64 | 1.4 |
| GETTEXT | PD-RHEL4U4 | GNU LIBRARIES AND UTILITIES FOR PRODUCING MULTI-LINGUAL... | DEVELOPMENT/TOOLS | IA64 | 0.14.1 |
| VCONFIG | PD-RHEL4U4 | LINUX 802.1Q VLAN CONFIGURATION UTILITY | SYSTEM ENVIRONMENT/B... | IA64 | 1.8 |
| ALCHEMIST | PD-RHEL4U4 | A MULTI-SOURCED CONFIGURATION BACK-END | SYSTEM ENVIRONMENT/B... | IA64 | 1.0.34 |
| SQUID | PD-RHEL4U4 | THE SQUID PROXY CAVHING SERVER. | SYSTEM ENVIRONMENT/D... | IA64 | 2.5.STABLE6 |
| CHKFONTPAHT | PD-RHEL4U4 | SIMPLE INTERFACE FOR EDITING THE FONT PATH FOR THE XFONT S... | SYSTEM ENVIRONMENT/B... | IA64 | 1.10.0 |
| LIBRAW1394 | PD-RHEL4U4 | LIBRARY PROVIDING LOW-LEVEL IEEE-1394 ACCESS | SYSTEM ENVIRONMENT/LI... | IA64 | 0.10.1 |

FIG. 6

| NODE NAME | COMMUNICATION ADDRESS | SYSTEM ID |
|---|---|---|
| PARTITION#1_10.XX.XX.XX | 10.XX.XX.XX | |

| HARDWARE | OPERATING SYSTEM RELEASE | |
|---|---|---|
| PQ480 | RED HAT ENTERPRISE LINUX AS RELEASE 4 (NAHANT UPDATE 4) | |

| HW STATE | COMMUNICATION STATE | TRAP STATE |
|---|---|---|
| OK | REACHABLE | |

| SHARED STATE |
|---|
| INTEGRATED |

FIG. 7

| SYSTEM INFORMATION | | |
|---|---|---|
| ▲▼ | NAME | SLES10SP1 |
| ▲▼ | | PQ-RHL4U4 |
| ▲▼ | MODEL | INTEL(R) ITANIUM(R) 2 PROCESSOR 1.50 GHZ WITH 4MB L3 CACHE STEP A2 |
| ▲▼ | PROCESSOR TYPE | INTEL(R) ITANIUM(R) 2 PROCESSOR |
| ▲▼ | NUMBER OF PROCESSORS/SOCKETS | UNKNOWN/VALUE_NUMOFEFFECTIVESOCKETS |
| ▲▼ | TOTAL MEMORY (MB) | 1844960 |
| ▲▼ | | 1971680 |
| ▲▼ | CACHE (KB) | 4096 |
| ▲▼ | OPERATING SYSTEM | SUSE LNUX |
| ▲▼ | | RED HAT EN. |
| ▲▼ | LOCATION | SERVER ROOM |
| ▲▼ | | UNKOWN |
| ▲▼ | CONTACT | SYSSDMIN |
| ▲▼ | | ROOT |
| ▲▼ | UP-TIME | 0DAYS |

FIG. 12

| LOG ID | | LOG123456 |
|---|---|---|
| PROBLEMATIC DATA | EVENT ID | 5946223 |
| | EVENT TYPE | ERROR |
| | MESSAGE | ABNORMAL END OF SERVICE WAS DETECTED: |
| | EVENT SOURCE | SERVICE NAME = XYZ |
| SYSTEM DATA | | 00112233-4455-6677-8899-AABBCCDDEEFF |
| ATTENDANT DATA | | 2009/7/1 12:00:00 |

FIG. 21

| CONFIGURATION TYPE | DATA VALUE | POINTER LIST FOR POINTING CHILD NODES |
|---|---|---|
| OS | X OS | 0012FF78, 00130078, 00130178 |

OPERATION MANAGEMENT DEVICE AND OPERATION MANAGEMENT METHOD

CROSS-REFERENCE TO RELATED APPLICATIONS

This is a continuation of Application PCT/JP2009/068850, filed on Nov. 4, 2009, now pending, the entire contents of which are incorporated herein by reference.

FIELD

The embodiment discussed herein is related to a technology of managing an operation of a device.

BACKGROUND

In a place such as an enterprise where a great number of information processing systems are utilized, system administrators exist separately from system users and monitor and cope with problems each hindering or having a possibility of hindering an operation of the system, such as a fault and abnormality in processing.

The information processing system includes multiple components that are roughly classified into hardware which performs an arithmetic process, a storage process, a display process and a communication process, and software such as an OS (Operating System), an application program and firmware that are used for these processes. Therefore, the system administrator is burdened with an operation of, if the problem such as the fault and the processing abnormality arises, examining which component causes the problem.

Such being the case, pieces of operation management software are developed for the purpose of reducing the loads on the management operations and are utilized by the administrators.

For example, if the problem occurs in a management target information processing system, the operation management software has a function of notifying the administrator of the problem through an alarm using a popup message, a mail, etc.

FIG. 1 illustrates an example of the alarm by a popup message. As depicted in FIG. 1, the operation management software displays items of information such as a node with the occurrence of the problem, a date/time thereof, seriousness thereof and a content of the alarm.

The administrator, who knew the occurrence of the problem from the alarm, examines a content and a cause of the problem by use of a log reference function of the operation management software. FIG. 2 illustrates an example of referring to logs extracted by the operation management software. The log, as depicted in FIG. 2, indicates items of information such as an event occurrence date/time, an event occurrence node, a message text representing a content of the event, an event occurrence module, an error code, weight of the event, an event occurrence component, a user and identifying information. Herein, the "events" are, e.g., a variety of phenomena detected by the operation management software within the information processing system.

Further, the operation management software, when referring to the logs, supports the administrator to perform the examination with a function of narrowing down a multiplicity of accumulated logs and a function of making a keyword-based search.

FIG. 3 illustrates an example of setting log narrow-down conditions. For instance, as depicted in FIG. 3, such events are searched that "Date" is posterior to "08/10/08 04:15 PM" and "Weight" is "Warning".

Only the reference to the logs is, however, confined to the administrator's knowing the problematic phenomenon and the occurrence location but does not reach a point of tracking down the cause in many cases. In this instance, the administrator compares the system undergoing the occurrence of the problem with the system not undergoing the occurrence of the problem, and finds out a clue for tracking down the cause of the problem according to a difference therebetween as the case may be. This is because it can happen that a component existing in the system with the occurrence of the problem but not existing in the system with non-occurrence of the problem contributes to the occurrence of the problem.

Hence, the administrator uses the functions of the operation management software to display and compare system components and attribute values of the system with the occurrence of the problem and of the system with non-occurrence of the problem.

FIG. 4 depicts a display example of a hardware configuration; FIG. 5 depicts a display example of a software configuration; and FIG. 6 depicts a display example of the attribute values.

For example, the hardware configuration is, as in FIG. 4, such that a node (Partiton#1_0.124.22.70) includes existences of components such as a housing (Chassis components) and a system board (SB#1). Further, the housing includes existences of units such as a power source (ACPDBH#0-#7) and a fan (FAN_A#0-A#5,B#0,B#1).

Moreover, the software configuration includes, as in FIG. 5, a software package name, a node name of the node to which the software belongs, an outline of the software, a category, an architecture, a version, etc., as software configuration elements.

Further, as for the attributes, as in FIG. 6, the attribute values of the node are given such as a node name, a communication address, a system ID, a hardware name, an OS name, an OS version, a hardware status, a communication status, etc.

There are numerous components and attributes of the system, and hence, when comparing two or plural systems with each other, it is a time-consuming operation for a person (administrator) to extract where a difference exists.

For this reason, there is software for extracting a difference between the two systems, and an attempt to gain higher efficiency of a comparing operation is made by use of this software.

FIG. 7 illustrates a display example of differential portions when comparing the two systems. In FIG. 7, the items to be compared are a name of the system, a model, a processor type, a memory capacity, an OS, an installation place, etc. Note that the same items in the two systems are given so that each of contents thereof is displayed in one line with no background color. For instance, in FIG. 7, the same items are the model, the processor type and the cache capacity. Further, the items having differences between the two systems are given so that each of contents is displayed on a per-line basis with the background color being varied. For example, in FIG. 7, different items are the name of the system, the memory capacity and the OS, in which the background color of the item "SLES10SP1" is provided by oblique lines, and the background color of the item "pq-rhl4u4" is provided by cross lines.

[Patent document 1] Japanese Laid-Open Patent Publication No. 2002-55717
[Patent document 2] Japanese Laid-Open Patent Publication No. 2004-101203
[Patent document 3] Japanese Laid-Open Patent Publication No. 2005-63332

[Non-Patent document 1] Ichise et al.: Learning of Alignment Rules between Concept Hierarchies, Journal of the Japanese Society for Artificial Intelligence, Volume 17, Third Issue F, PP. 230-238 (Year of 2002)

SUMMARY

According to an aspect of the embodiment, an operation management device includes a collecting unit to receive management data of elements provided in a plurality of management target devices, an analyzing unit to obtain a dependency relation of problematic data defined as data of devices with occurrence of the problem in the received management data according to definition information which defines a dependency relation between the elements and to obtain a dependency relation of non-problematic data defined as data of the devices with non-occurrence of the problem in the received management data according to the definition information, and a comparing unit to obtain management data of a common element by comparing the problematic data with the non-problematic data and to extract a difference between the problematic data and the non-problematic data with respect to management data of elements dependent on the common element.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a diagram illustrating an example of an alarm by a popup message.

FIG. 2 is a diagram illustrating an example of referring to logs extracted by operation management software.

FIG. 5 is a diagram illustrating a display example of a software configuration.

FIG. 6 is a diagram illustrating a display example of attribute values.

FIG. 7 is a diagram illustrating a display example of differential portions in the case of comparing systems.

FIG. 12 is a diagram illustrating a data structure of log data.

FIG. 21 is a diagram illustrating a data structure of a node.

DESCRIPTION OF EMBODIMENTS

As described previously, even when extracting the difference between the systems, it is still time-consuming to select a difference having a plausibility of getting involved in occurrence of an examination target problem and a difference not having the plausibility from within a large number of differences, and a high-level skill is needed of the administrator.

Figure 3:
FIG. 3 is a diagram illustrating an example of setting log narrow-down conditions.
Figure 4:
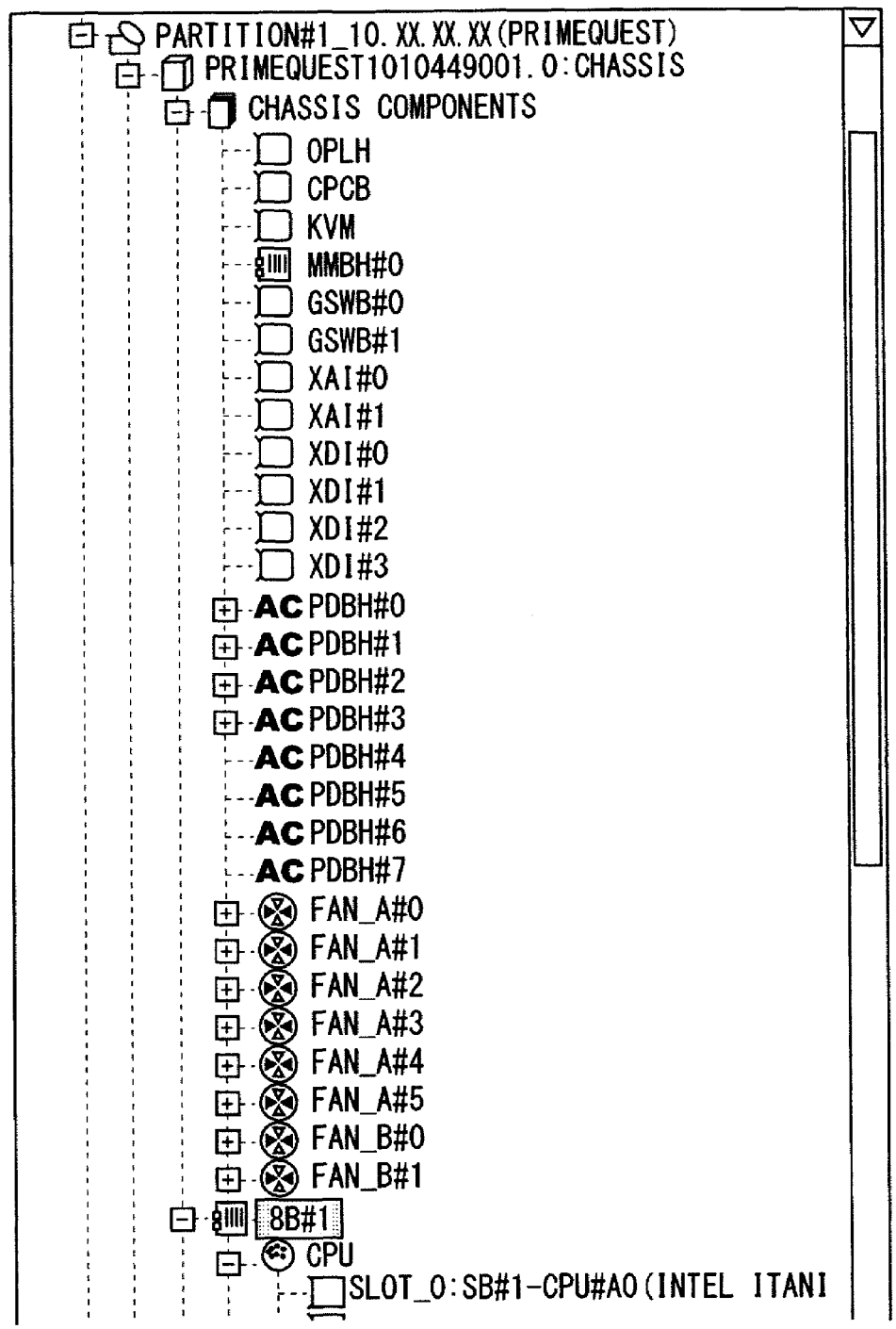
FIG. 4 is a diagram illustrating a display example of a hardware configuration.
Figure 8:
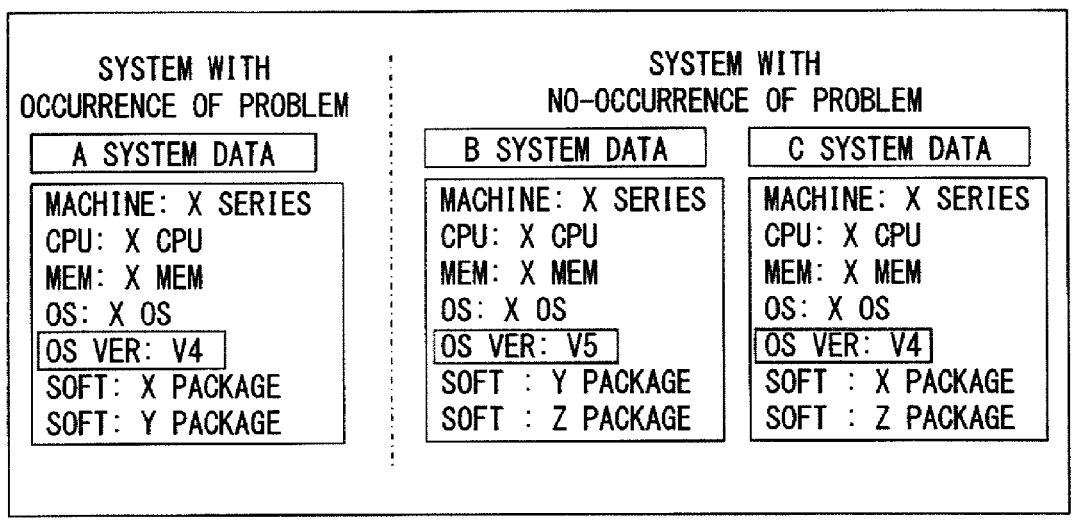
FIG. 8 is a diagram illustrating an example of making a comparison between a system with occurrence of a problem and a system with non-occurrence of the problem.

For instance, as illustrated in FIG. 8, there are a system A with the occurrence of the problem and a system B with non-occurrence of the problem, in which case the administrator establishes, it is assumed, a hypothesis that the OS gets involved in the occurrence of the problem. From this point of view, as a result of comparing the system A with the system B, if there is a difference in OS version number therebetween, such a possibility is considered that the OS version number gets involved in the occurrence of the problem. When comparing the system A with a system C with non-occurrence of the problem and if these two systems have the same OS version number, however, a possibility is that the occurrence of the problem does not depend on the OS version number. In this case, an advancement of the examination entails seeking out a characteristic found in the system with the occurrence of the problem by comparing the systems in a way that changes the viewpoint.

In order to draw a cause of the occurrence of the problem or a hypothesis thereof from this examination method, it is effective to compare a greater number of systems. To take time and effort into consideration, however, if the person (administrator) compares the systems, what is important is to infer effectiveness as to which system is set as the comparison target and what viewpoint the comparison is made from and to properly set the comparison target and the viewpoint for the comparison. Hence, it follows that the advancement of the examination depends on the skill of the administrator.

An operation management device in an embodiment will hereinafter be described with reference to the drawings. A configuration of the following embodiment is an exemplification, and the operation management device is not limited to the configuration of the embodiment.

An information processing system in a first embodiment does not extract a simple difference between a system with occurrence of a problem and a system with non-occurrence of the problem but finds out a difference having a plausibility of contributing to detection of a cause of the problem. Herein, the difference having the plausibility of contributing to the detection of the cause can be considered to be, e.g., a difference in configuration etc. between a system undergoing non-occurrence of a problem but having common points in some of configurations and attributes with respect to the system with the occurrence of the problem, and the system with the occurrence of the problem.

Figure 9:
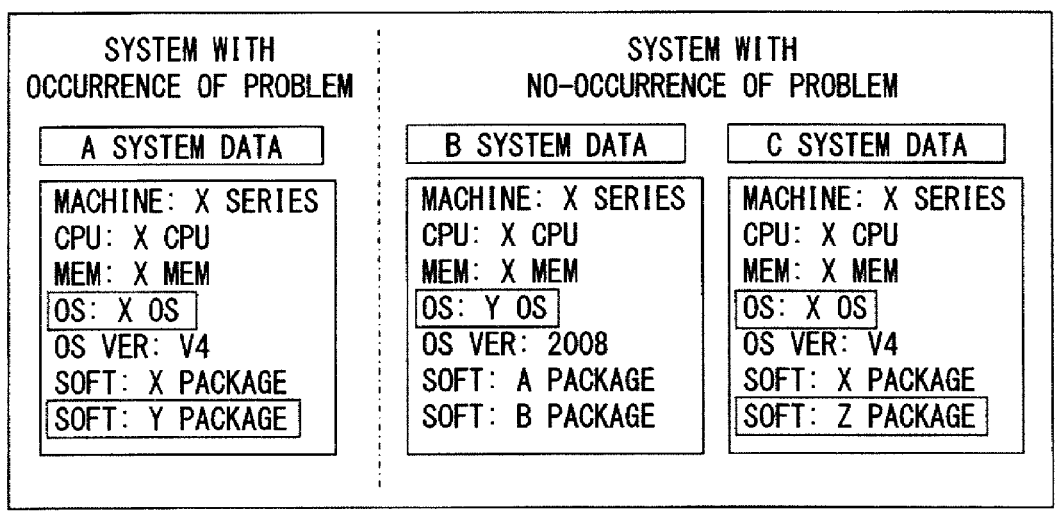
FIG. 9 is a diagram illustrating the example of making the comparison between the system with the occurrence of the problem and the system with the non-occurrence of the problem.

The difference having the plausibility of contributing to the detection of the cause of the problem which occurs, will be described in a way that takes FIG. 9 for instance. In the example of FIG. 9, there are a system A with the occurrence of the problem and systems B, C with non-occurrence of the problem. Herein, an assumption is that the problem arising in the system A is a problem dependent on software contained in an OS. In this case, if the OSs (Operating Systems) to be applied are different as applied to the system A and the system B, the software components contained in the respective OSs are different, and hence differences in OS version number and in software configuration, which are detected as derived from the difference between the OSs, are pieces of meaningless information.

On the other hand, the system A and the system C use the same OS. In this case, the difference between the software components contained in the OSs can be considered meaningful. In the example of FIG. 9, it is feasible to extract characteristics such as "Y package is included" and "Z package is not included" from the system A as a result of comparison between the system A and the system C. Thus, it is effective in examining the cause of the problem to compare the system undergoing the occurrence of the problem with the system undergoing non-occurrence of the problem though having similarity to the system with the occurrence of the problem and to extract a difference between these systems.

To be specific, as in the case of the OS "X OS" shared by the system A and the system C, data in common with the system with the occurrence of the problem and the system with non-occurrence of the problem are extracted, and thereafter, with respect to data dependent on the common data such as "Y package" defined as the software dependent on the OS, there is extracted a difference in configuration between the system with the occurrence of the problem and the system with non-occurrence of the problem.

In the first embodiment, an operation management device, if there is the plurality of systems with the occurrence of the problem at which the examination of the cause is targeted, at first extracts items of data of the configuration and the attribute (problem occurrence common data) in common with these systems undergoing the occurrence of the problem among all of the systems to be managed. Next, the operation management device extracts all of the data of the configurations and the attributes (problem non-occurrence data) of the systems with non-occurrence of the problem among all of the systems to be managed. Then, the operation management device compares the problem occurrence common data with the problem non-occurrence data, then extracts the data (above-described X OS etc.) in common with these two items of data, and extracts a difference between pieces of data (above-described Y package etc.) dependent on the extracted common data. The result, i.e., the difference acquired by this method is the difference between the system with the occurrence of the problem and the system with non-occurrence of the problem though similar to the system with the occurrence of the problem and, it follows, represents the characteristic of the system undergoing the occurrence of the problem more clearly than the simple difference in configuration between the systems.

<System Architecture>

Figure 25:
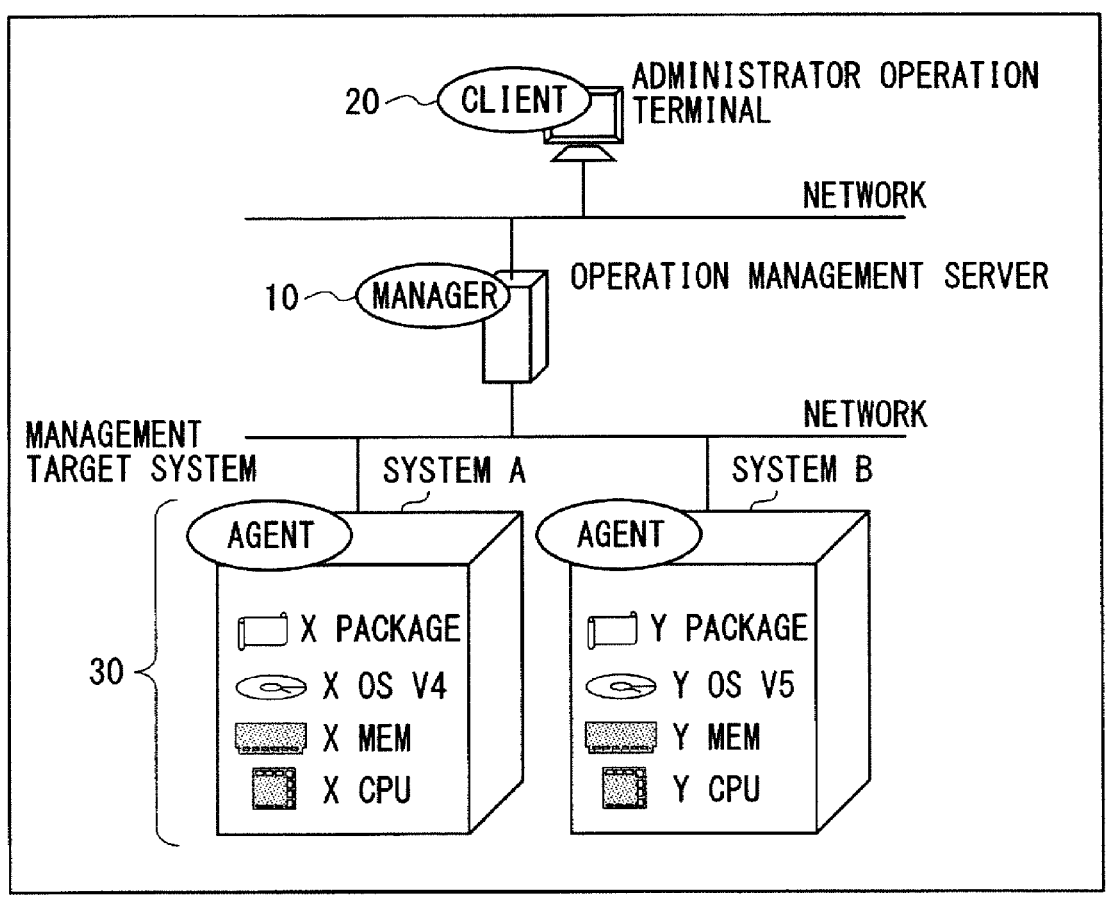
FIG. 25 is a block diagram of the operation management system.

FIG. 25 is a block diagram of an operation management system. The operation management system in the first embodiment includes an operation management device 10, a client 20 and a monitoring target system 30, which are connected via networks and lines such as cables etc.

Figure 10:
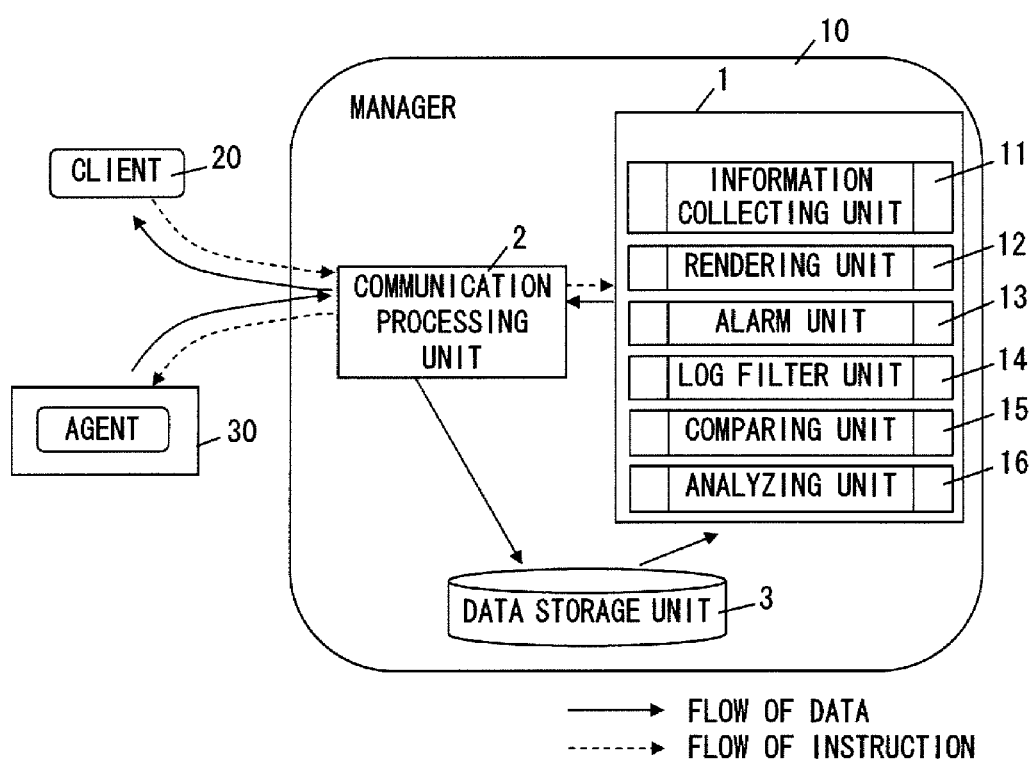
FIG. 10 is a schematic diagram of a configuration of an operation management device.

The operation management device 10 is, as illustrated in FIG. 10, a computer including a data processing unit 1 which executes a data arithmetic process, a communication processing unit 2 which performs communications with other devices, and a data storage unit 3 stored with data and software for the arithmetic process, and will hereinafter be referred to also as a manager. The communication processing unit 2 performs the communications with other computers via the networks and the lines such as the cables etc.

The data storage unit 3 is a storage unit such as a hard disk and a Solid State Drive (SSD) and is stored with the operating system (OS) and an application program (operation management software is given by way of an example). Further, the data storage unit 3 is stored with configuration data, log data, an analysis result and a schema of the data, which are received from an agent of the monitoring target system 30.

The data processing unit 1 includes a CPU and a main memory and reads the programs such as the OS and the application software from the data storage unit 3 into the main memory, in which the CPU executes, based on the readout programs, the arithmetic process of the data etc. received by the communication processing unit 2. With this arithmetic process, the CPU functions also as an information collecting unit 11, a rendering unit 12, an alarm unit 13, a log filter unit 14, a comparing unit 15 and an analyzing unit 16.

The information collecting unit 11 requests, in response to a request given from the client 20, the monitoring target device, i.e., the agent of the monitoring target system 30 for management data, and receives, i.e., collects the management information of the monitoring target system 30 from the agent. Further, the information collecting unit 11 receives the management data that is voluntarily transmitted from the agent of the monitoring target system 30. Note that in the first embodiment the management data are the data containing the configuration data or the log data, in which the configuration data is information on the respective components included by the monitoring target system 30, and the log data is data of the logs of the monitoring target system 30.

The rendering unit 12 gets the analysis result of the analyzing unit 16 displayed on a display unit (unillustrated).

The alarm unit 13 outputs an alarm if the data collected by the information collecting unit 11 satisfies a predetermined condition and the problem occurs or when determining that there is a possibility that the problem might occur. For example, the alarm unit 13 sets a message associated with the arising problem as the alarm, and notifies the client 20 of this alarm via the communication processing unit 2. Further, the alarm unit 13 may transmit the alarm by e-mail to a predetermined address of an administrator etc.

The log filter unit 14 extracts (filters) the log data in the data collected by the information collecting unit 11 according to a condition specified by the client 20.

The analyzing unit 1 distinguishes a device with the occurrence of the problem on the basis of the data received by the information collecting unit 11, and classifies the configuration data in the received data into problematic data defined as the data of the device with the occurrence of the problem and non-problematic data defined as the data of the device with non-occurrence of the problem. Then, the analyzing unit 16 determines a dependency relation of the configuration data of the respective elements that are classified into the problematic data on the basis of predetermined definition information, and also determines the dependency relation of the configuration data of the respective elements that are classified into the non-problematic data on the basis of the predetermined definition information. The analysis result is transmitted to the client 20 via the communication processing unit 2.

The comparing unit 15 obtains the configuration data of the common elements by comparing the problematic data with the non-problematic data, and extracts a difference between the problematic data and the non-problematic data with respect to configuration data dependent on the configuration data of the common elements.

In the first embodiment, the data collected by the information collecting unit 11 contain the configuration data and the log data. Note that analyzing unit 16 determines the dependency relation between the configuration data concerned and other sets of configuration data on the basis of the predetermined definition information, and the configuration data are, as depicted in FIG. 11, mapped to a tree structure.

Figure 11:
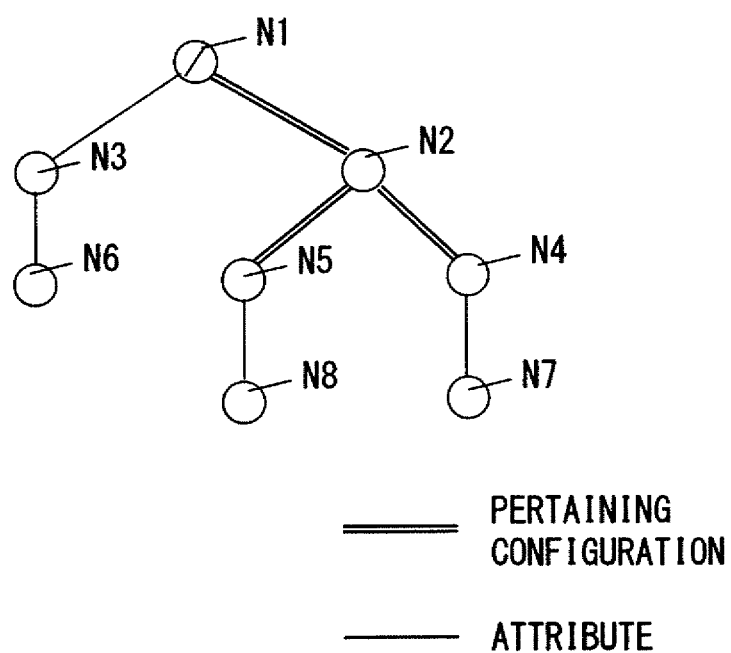
FIG. 11 is an explanatory diagram of a tree structure of management data.

In FIG. 11, encircled nodes represent a system architecture built up by the configuration data, the node located in the uppermost position in FIG. 11 is a root node, and the nodes linking up with the root node and located in lower positions in FIG. 11 are nodes subordinate to the root node. For example, nodes N2, N3 are the nodes subordinate to a root node N1, and nodes N4, N5 are the nodes subordinate to the node N2. It is to be noted that in FIG. 11 a single-line link represents such a type of node that the subordinate node indicates an attribute of the host node, and a double-line link indicates such a type of node that the subordinate node represents a configuration pertaining to the host node in the configurations included in the system. To be specific, the node N2 has the configuration pertaining to the node N1, while the node N3 is the node indicating the attribute of the node N1. For example, the link between the node indicating the OS and the node representing the version (the attribute of the OS) is depicted by the single line, while the link between the node indicating the OS and the node representing the package (the configuration pertaining to the OS) for the OS is depicted by the double lines.

On the other hand, the log data in the first embodiment has, e.g., as illustrated in FIG. 12, a "log ID" field, a "problematic data" field, a "system data" field and an "attendant data" field. Herein, the log ID is defined as identifying information for specifying the log. The problematic data is data which indicates the problem arising in the system, and contains an event type indicating whether an event occurring in the monitoring target system 30 is an error or an alarm, an event ID which specifies the occurrent event, an event source indicating a module in which the event occurs, a message corresponding to the event, and so on. The system data is identifying information which specifies the monitoring target system which outputs the log concerned, and is, e.g., a Globally Unique Identifier (GUID). Further, the attendant information represents other categories of information, such as problem occurrence time, attendant on the occurrent problem.

The configuration data and the log data are transmitted from the agent as a response to the request given from a manager 10 in one case and are voluntarily transmitted from the agent in another case.

Figure 13:
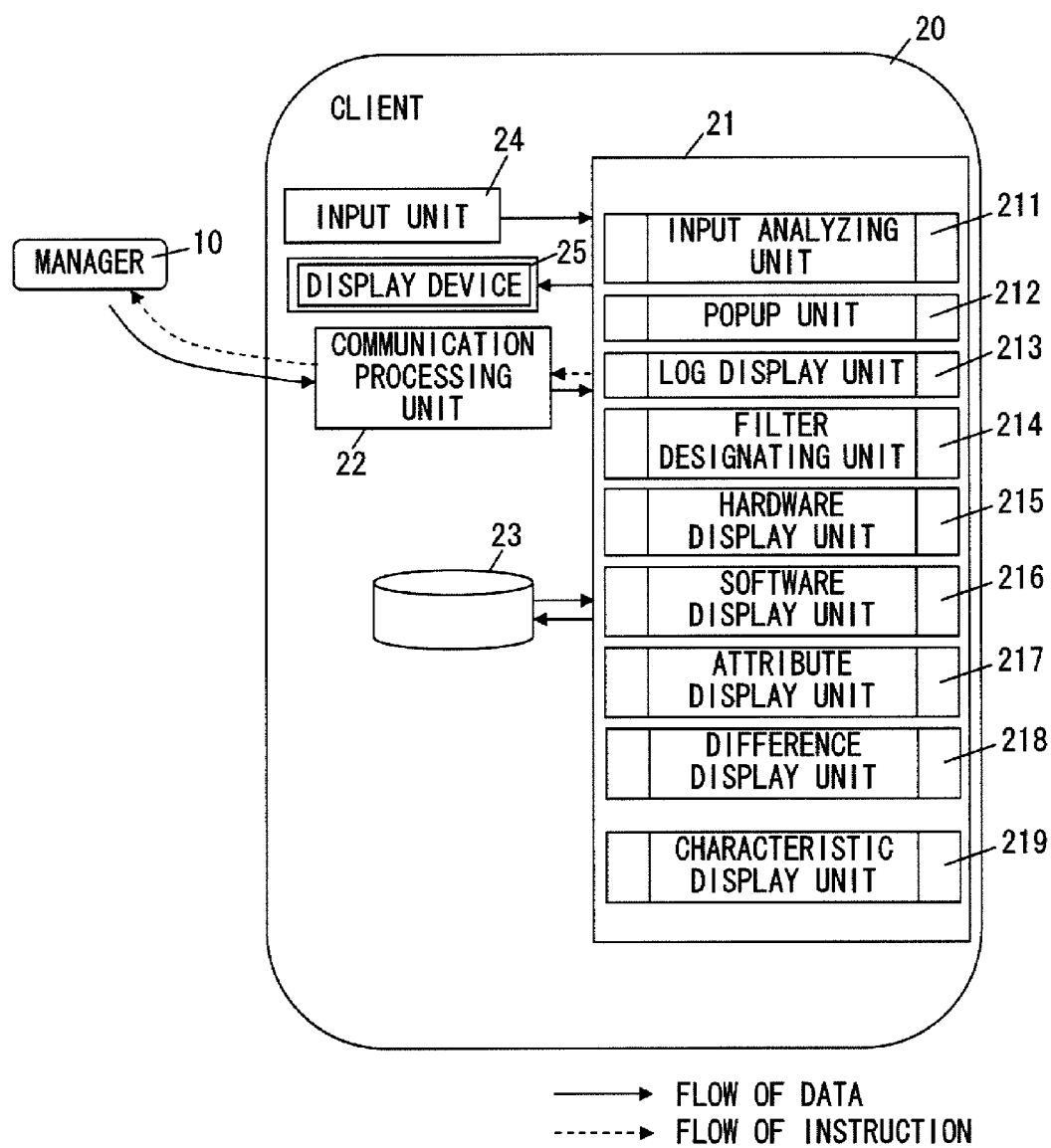
FIG. 13 is a block diagram of a client.

FIG. 13 is a block diagram of the client 20. The client 20 is a computer including, as depicted in FIG. 13, a data processing unit 21 which executes the arithmetic process of the data, a communication processing unit 22 which performs the communications with other devices, a storage unit 23 stored with the data and the software for the arithmetic process, an input unit 24 and an output unit (which is a display device in the example of FIG. 13) 25.

The communication processing unit 22 performs the communications with other computers via the networks and the lines such as the cables etc.

The storage unit 23 is an auxiliary storage unit such as a hard disc and an SSD and is stored with an operating system (OS) and an application program (a client program etc.)

The input unit 24 is a means for inputting the information to the data processing unit 21 and includes user interfaces such as a keyboard and a pointing device and a device which reads the information from storage mediums such as a memory card and a CD-ROM.

The output unit 25 is a means for outputting a processing result of the data processing unit 21 and includes a display device which displays the analysis result etc., a speaker which outputs a sound of the alarm etc. and a printer which prints the data of the logs etc.

The data processing unit 21 includes the CPU and the main memory. The CPU reads the OS and the application program from the storage unit 23 into the main memory, and executes the arithmetic process of the data etc. received by the communication processing unit 22 in accordance with the readout OS and application program. With this arithmetic process, the CPU functions also as an input analyzing unit 211, a popup unit 212, a log display unit 213, a filter designating unit 214, a hardware display unit 215, a software display unit 216, an attribute display unit 217, a difference display unit 218 and a characteristic display unit 219.

The CPU functioning as the input analyzing unit 211 analyzes the input information input from the input unit 24 by an operation of the administrator and transmits a corresponding instruction to each unit. For example, if the input information is what requests an analysis of the system in which the problem occurs, the input analyzing unit 211 requests the manager 10 for the characteristics of the system with the occurrence of the problem via the communication processing unit 22. Further, the input analyzing unit 211, if the input information is what requests displaying of the log, the hardware, the software and the attribute, transmits these display requests to the manager 10.

The CPU functioning as the popup display unit 212 popup-displays the information received from the manager 10 on the display device. For example, when receiving from the manager 10 a message purporting that the problem occurs, the message is popup-displayed.

The CPU functioning as the log display unit 213, when receiving the log data from the manager 10, displays the log of the monitoring target system on the display device on the basis of the log data.

The CPU functioning as the filter designating unit 214, when displaying the log, the hardware and the software, designates a filter by transmitting a filter (condition) selected by the administrator to the manager 10 in order to narrow down the items to be displayed.

The CPU functioning as the hardware display unit 215, when receiving the data of the hardware from the manager 10, displays the information on the hardware provided in the management target system on the basis of the received data.

The CPU functioning as the software display unit 216, when receiving the data of the software from the manager 10, displays the information on the software used in the management target system on the basis of the received data.

The CPU functioning as the attribute display unit 217, when receiving the data of the attributes from the manager 10, displays the information on the attributes of the elements used in the management target system on the basis of the received data.

The CPU functioning as the difference display unit 218, when receiving the data of the difference from the manager 10, displays the difference between the elements used in the management target system on the basis of the received data.

The CPU functioning as the characteristic display unit 219, when receiving the data of the characteristics from the manager 10, displays the characteristics of the system with the occurrence of the problem on the basis of the received data.

Figure 14:
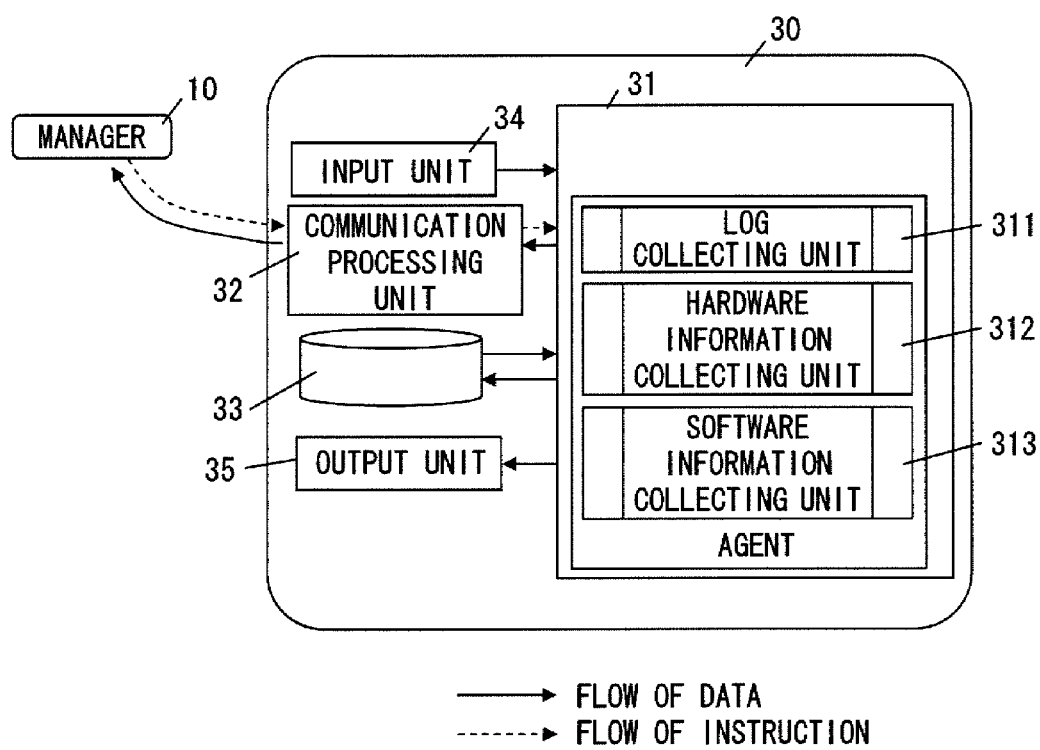
FIG. 14 is a functional block diagram of a monitoring target system.

FIG. 14 is a block diagram of the monitoring target system 30. The monitoring target system 30 is a computer including, as depicted in FIG. 14, a data processing unit 31 which executes the arithmetic process of the data, a communication processing unit 32 which performs the communications with other devices, a storage unit 33 stored with the data and the software for the arithmetic process, an input unit 34 and an output unit 35.

The communication processing unit 32 performs the communications with other computers via the networks and the lines such as the cables etc.

The storage unit 33 is the auxiliary storage unit such as the hard disc and the SSD and is stored with an operating system (OS) and an application program (an agent program). The agent program may take a mode of an originally built-in firmware of the management target information processing system and may also take a mode of software that is installed into the system.

The input unit 34 is a means for inputting the information to the data processing unit 31 and includes user interfaces such as the keyboard and the pointing device and the device which reads the information from the storage mediums such as the memory card and the CD-ROM.

The output unit 35 is a means for outputting the processing result of the data processing unit 31 and includes the display device which displays the analysis result etc., the speaker which outputs the sound of the alarm etc. and the printer which prints the data of the logs etc.

The data processing unit 31 includes the CPU and the main memory. The CPU reads the OS and the application program from the storage unit 33 into the main memory, and executes the arithmetic process of the data etc. received by the communication processing unit 32 in accordance with the readout OS and application program. With this arithmetic process, the CPU functions also as a log collecting unit 311, a hardware information collecting unit 312 and a software information collecting unit 313. Note that the CPU, i.e., the function units 311-313 executing the agent program are generically referred to as an agent. FIG. 14 illustrates the function units 311-313 that run according to the agent program, however, the management target system 30 realizes other functions such as a database, a Web server and a file server etc.

The log collecting unit 311 collects the logs of the self-system and transmits the collected logs as log data to the manager 10 via the communication processing unit 32. For instance, the log collecting unit 311 transmits the collected log data to the manager 10 each time a new log is output or periodically. Further, the log collecting unit 311, when receiving a request for the log data from the manager 10, reads the logs of the system from the main memory and transmits the logs to the manager 10 via the communication processing unit 32.

The hardware information collecting unit 312, when receiving a request for the information on the hardware from the manager 10, reads individual items of information from the respective pieces of hardware provided in the self-system, and sends the readout information as hardware information back to the manager 10. Note that the hardware information may also be, without being limited to when requested from the manager 10, collected when the hardware is connected to the system. For example, the hardware information collecting unit 312, when detecting by a plug-and-play function that the hardware is connected to the system, reads the hardware information from a ROM provided in this connected hardware and stores the readout information in the main memory. Then, when receiving the request for the hardware information from the manager 10, the hardware information collecting unit 312 may read the hardware information from the main memory and transmit the readout information back to the manager 10. Note that the hardware information collecting unit 312 collects, in addition to the information related to the configurations of the respective pieces of hardware, the attributes of the respective pieces of hardware and transmits the collected attributes as the hardware information to the manager 10.

Further, the hardware information collecting unit 312 may, without depending on the request given from the manager 10, collect the hardware information and transmit the collected information to the manager 10. For example, if the hardware is detached and if a hardware driver is updated, the hardware information collecting unit 312 may collect the hardware information and transmit the collected information to the manager 10 at a predetermined cycle.

The software information collecting unit 313, when receiving a request for software information from the manager 10, reads the information on respective pieces of software provided in the self-system from a predetermined storage area, e.g., a registry, and transmits the readout information as the software data back to the manager 10. Note that the software information collecting unit 313, collects, in addition to the information related to the configurations of the respective pieces of software, the attributes of the respective pieces of software and transmits the collected attributes as the software information to the manager 10.

Furthermore, the software information collecting unit 313 may, without depending on the request given from the manager 10, transmit the software information to the manager 10. For example, if the software is installed or uninstalled or updated, the software information collecting unit 313 may collect the software information and transmit the collected information to the manager 10 at the predetermined cycle.

<Description of Operation Management Method>

Figure 15:
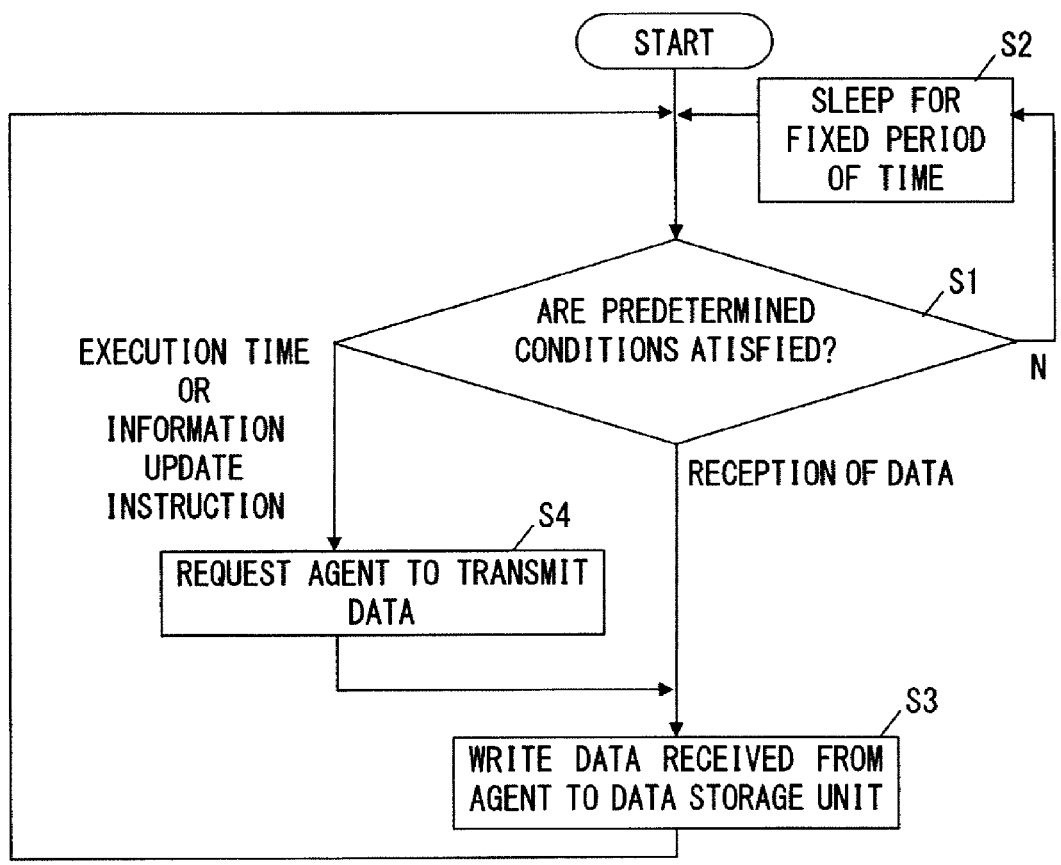
FIG. 15 is an explanatory diagram of a process in which a manager writes the management data to a data storage unit.

FIG. 15 is an explanatory diagram of how the manager 10 receives management data from the agent of the monitoring target system 30 and writes the management data to the data storage unit 3.

The information collecting unit 11 of the manager 10 determines whether or not a predetermined condition for receiving the management data, i.e., the configuration data and the log data is satisfied (S1), then, if the predetermined condition is not satisfied, sleeps the operation for a fixed period of time (S2) and stands by till the condition is satisfied (S1, S2). In the present example, the condition in S1 is whether time for executing periodic polling is reached, or whether a request for updating or analyzing the management data is received from the client 20 or whether the management data is transmitted from the agent.

If the management data is transmitted from the agent of the monitoring target system 30, the information collecting unit 11 stores the received management data in the data storage unit 3 (S3).

Further, in S1, if the time for executing the polling is reached, or if the request for updating the information is received, the information collecting unit 11 requests the agent to transmit the management data, i.e., transmits the request for the management data to the management target system (S4). The information collecting unit 11 receives the management data transmitted from the agent in response to the request given from this information collecting unit 11 and stores the management data in the data storage unit 3 (S3).

Figure 16:
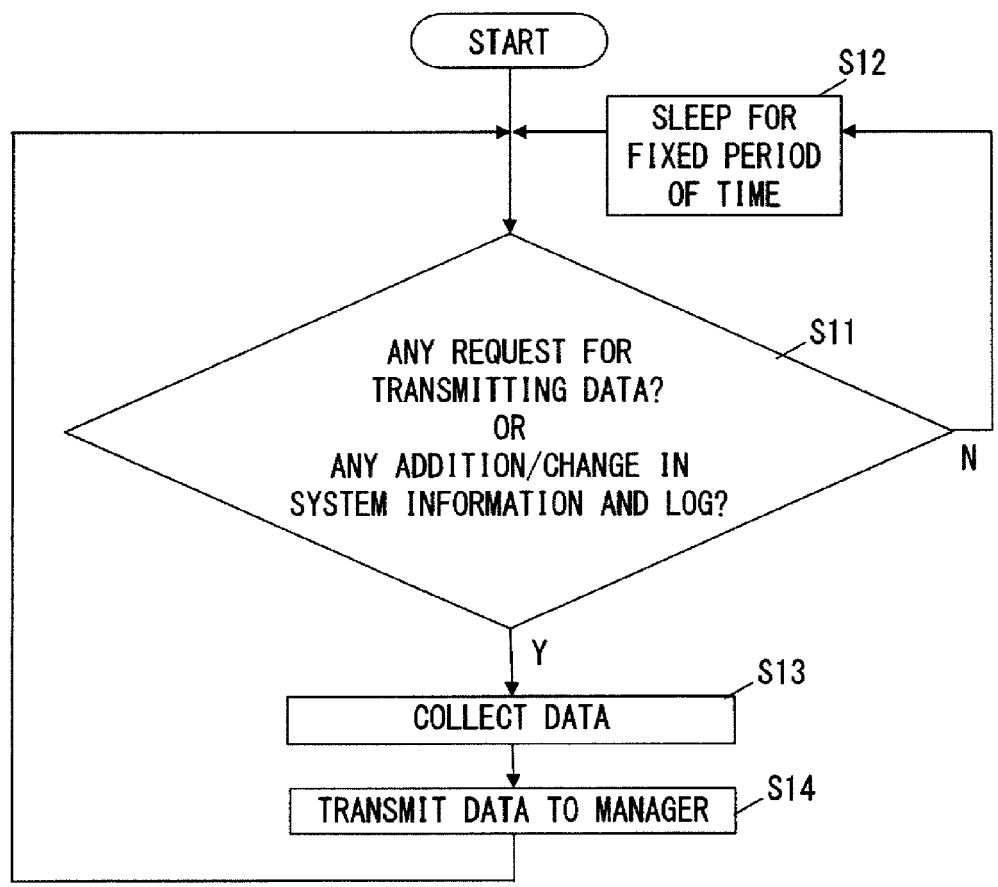
FIG. 16 is an explanatory diagram of a process of how an agent transmits the management data.

FIG. 16 is an explanatory diagram of a process in which the agent of the monitoring target system 30 transmits the management data to the manager 10.

The agent determines whether or not the predetermined condition for transmitting the management data, i.e., the configuration data or the log data is satisfied (S11), then, if the predetermined condition is not satisfied, sleeps the operation for the fixed period of time (S12) and stands by till the condition is satisfied (S11, S12). In the present example, the condition in S11 is whether the request for the management data is received, or whether there is any addition to the log data or whether there is any change in configuration data.

If the condition in S11 is satisfied (S11; Yes), the agent collects the management data (S13). To be specific, in S11, if the request for the configuration data is received, the requested configuration data are collected by the hardware information collecting unit 312 or by the software information collecting unit 313. Moreover, if there is the change in the configuration data, the changed configuration data are collected by the hardware information collecting unit 312 or by the software information collecting unit 313. Further, if there is the addition to the log data, the log collecting unit 311 collects the logs.

Then, the agent transmits the management data collected in S13 to the manager 10 (S14).

Note that FIG. 16 illustrates the example of collecting the management data in response to the request (S11) for the management data (S13) and transmitting the collected data to the manager 10 (S14), however, the management data may also be collected beforehand and transmitted in response to the request.

Figure 17:
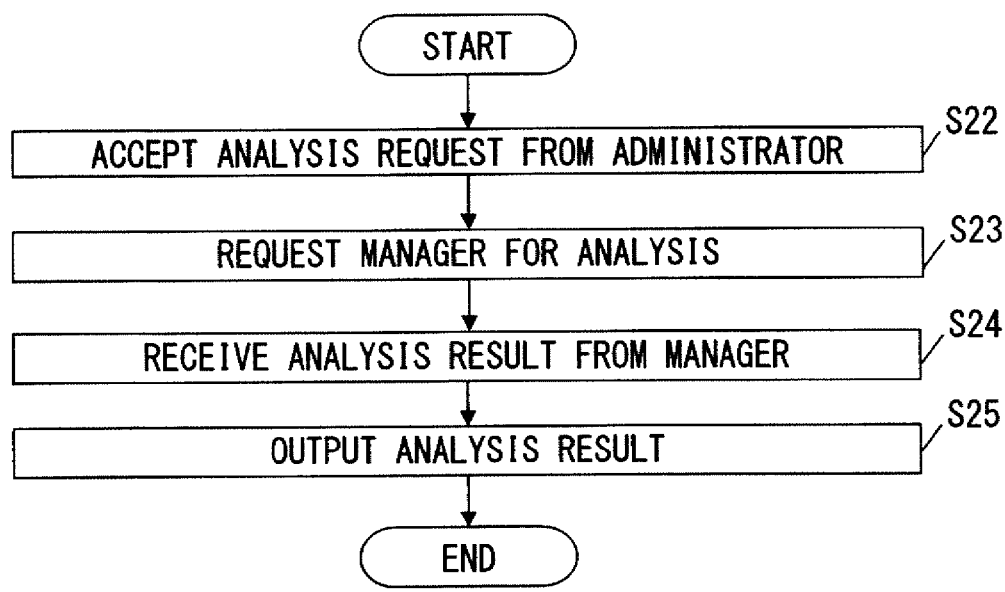
FIG. 17 is an explanatory diagram of a process of how the client receives and outputs an analysis result.

FIG. 17 is an explanatory diagram of a process in which the client 20 makes a request for analysis and receives and outputs an analysis result.

The administrator selects the log indicating the occurrence of the problem by getting the log display unit 213 to display a list of logs, and inputs, to the client 20, a request for analyzing the system which outputs the log concerned, i.e., the system in which the problem occurs.

The input analyzing unit 211 of the client 20, when accepting the request for analyzing the system with the occurrence of the problem from the administrator (S22), transmits the analysis request containing a log ID of the log selected by the administrator to the manager 10 (S23).

Then, the client 20 receives the analysis result from the manager 10 via the communication processing unit 22 (S24), and the characteristic display unit 219 displays the analysis result on the display device (S25).

Figure 18:
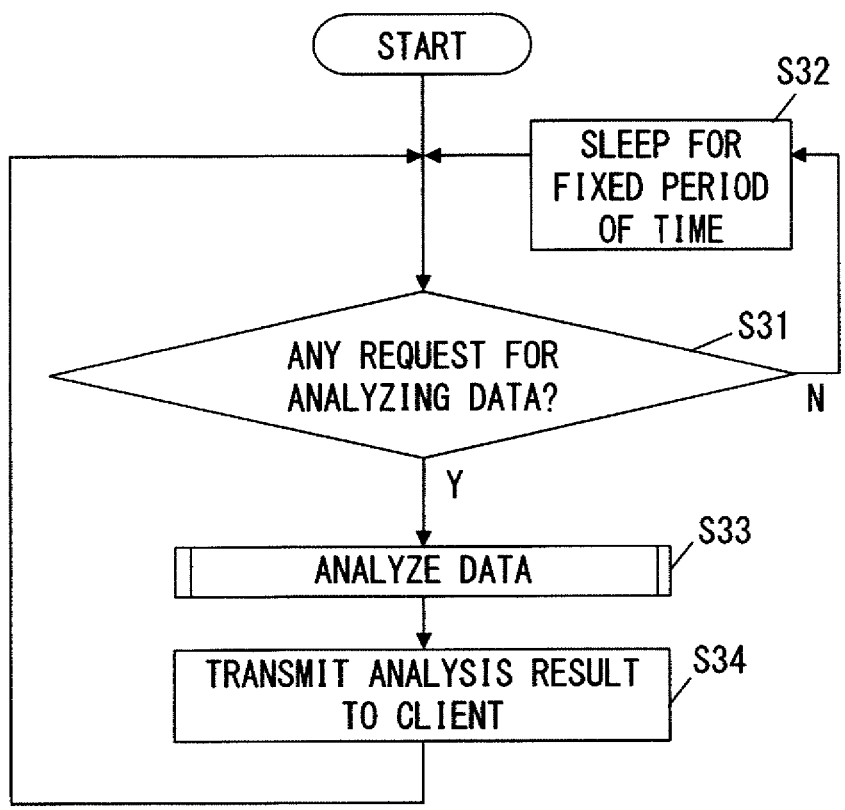
FIG. 18 is an explanatory diagram of a process of how the manager makes an analysis and transmits the analysis result.

FIG. 18 is an explanatory diagram of a process in which the manager 10 conducts the analysis in response to the request and transmits the analysis result to the client.

The analyzing unit 16 of the manager 10 determines whether there is the analysis request or not (S31), then, if none of the request is given (S31; No), sleeps the operation for the fixed period of time (S32), and stands by till the request is given.

If the analysis request is given (S31; Yes), the analyzing unit 16 executes the analysis process based on the management data received from the agent (S33), and transmits the analysis result to the client (S34).

Figure 19:
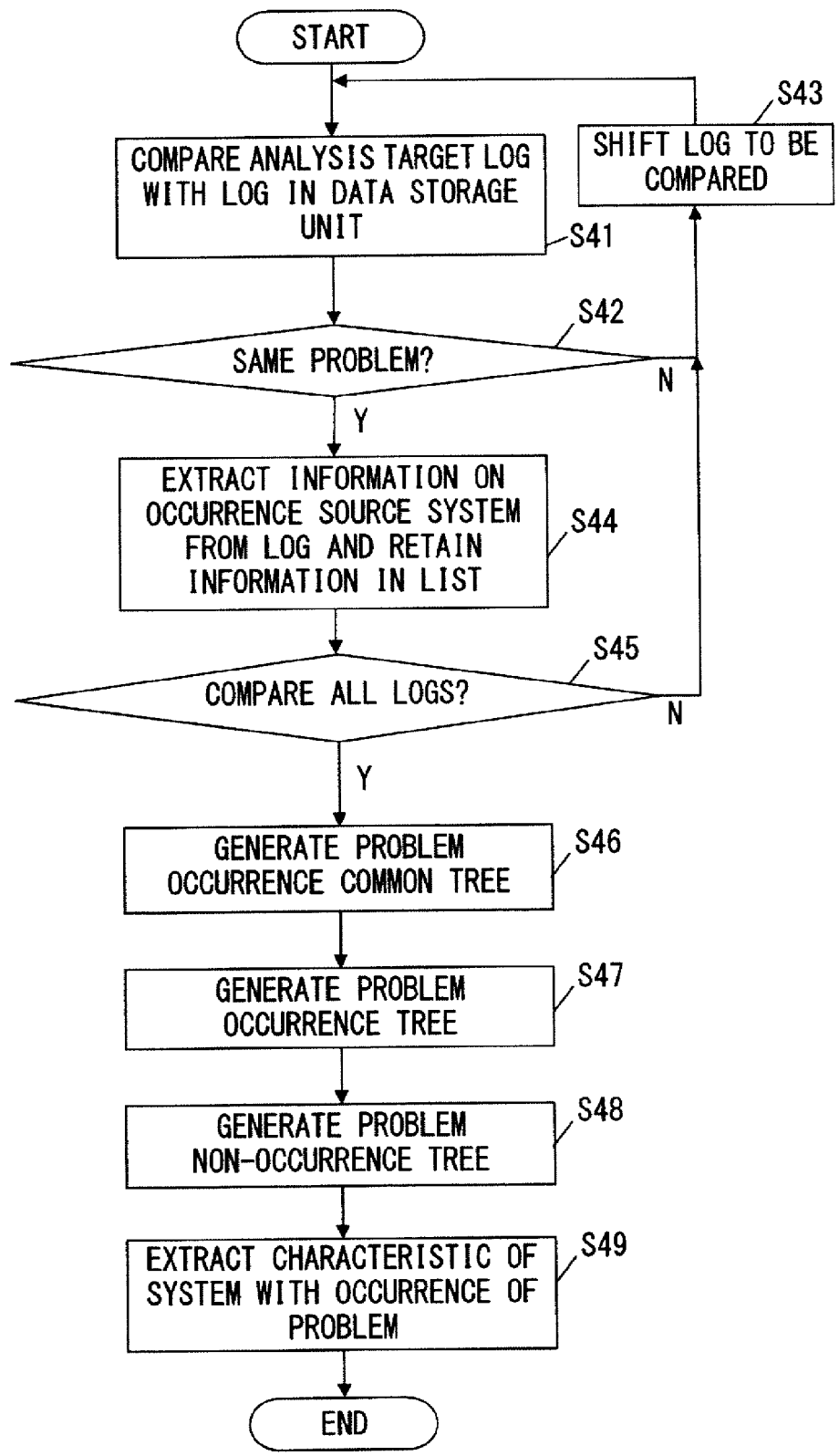
FIG. 19 is an explanatory diagram of a data analyzing process.

FIG. 19 is a diagram illustrating in detail the analysis process S33 in FIG. 18.

The analyzing unit 16 of the manager 10 obtains an analysis target log from the log ID contained in the request received from the client 20, and sequentially compares the analysis target log with the logs retained in the data storage unit 3 (S41).

As a result of the comparison, the analyzing unit 16 determines whether or not the same problem as that of the analysis target log exists in the log retained in the data storage unit 3 (S42). Herein, the analyzing unit 16, if the event ID contained as problematic data in the analysis target log exists in the log retained in the data storage unit 3, determines that same event occurs between the analysis target log and the log retained in the data storage unit 3, i.e., determines that same problem exists. Namely, the analyzing unit 16, if the event ID contained as problematic data in the analysis target log does not exist in the log retained in the data storage unit 3, determines that same problem does not exist between the analysis target log and the log retained in the data storage unit 3. Note that the analyzing unit 16 may make the determination by use of, without being limited to the event ID, other items of information such as an event type and an event source.

If the same problem does not exist between the analysis target log and the log within the data storage unit (S42; No), the analyzing unit 16 shifts the log within the data storage unit to compare next, and iterates the comparison with the analysis target log (S43, S41).

Further, if the same problem exists between the analysis target log and the log within the data storage unit (S42; Yes), the analyzing unit 16 extracts the identifying information of the system from the analysis target log, and writes the extracted system identifying information to a problem occurrence list stored in the memory or the data storage unit 3. It is to be noted that the identifying information overlapped with the identifying information, which has already been written to the problem occurrence list, is excluded from the writing target information.

Then, the analyzing unit 16 determines whether or not the comparisons between all of the logs within the data storage unit 3 and the analysis target log are completed (S45), and, if not completed (S45; No), repeats the comparison by shifting the log within the data storage unit to compare next (S43, S41).

If the comparisons with all of the logs are terminated and if the problem occurrence list is completed (S45; Yes), the analyzing unit 16 extracts, from the data storage unit 3, the management data associated with the identifying information written to the problem occurrence list, i.e., the identifying information of the system in which the problem has ever arisen. Then, the analyzing unit 16, as will be described later on by use of FIG. 20, maps the data shared by all of the systems in which the problem has ever arisen to the single three structure according to a schema, and thus generates a problem occurrence common tree (S46). Herein, the schema of the tree structure may be what is previously defined in the operation management system and may also be what is defined by the administrator on the occasion of the analysis. In the data mapping, if there is no common data with respect to a certain node, this node and child nodes subordinate thereto are to be deleted.

Figure 20:
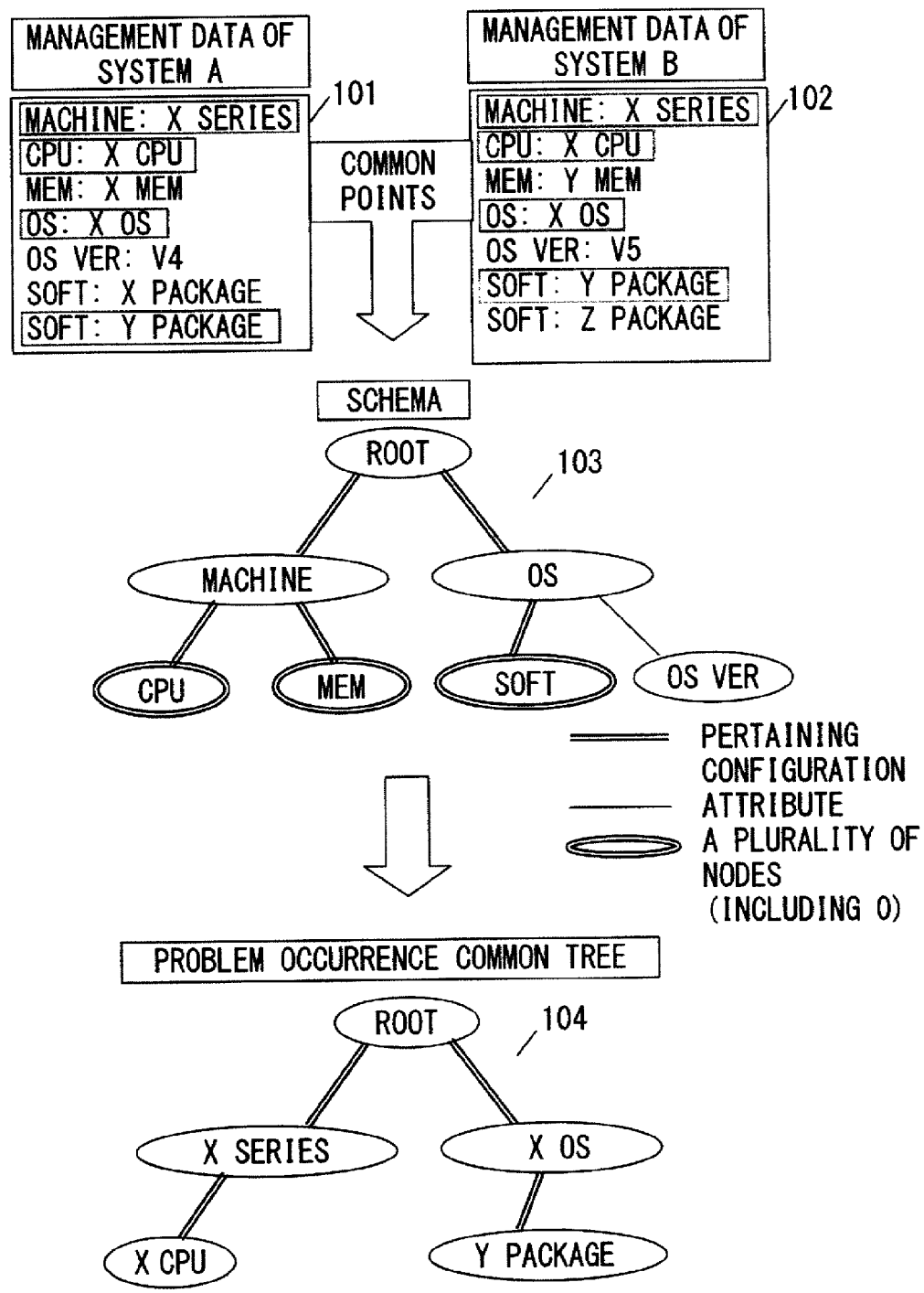
FIG. 20 is a diagram illustrating a specific example of a process of generating a problem occurrence common tree.

FIG. 20 is a diagram illustrating a tangible example of a process of generating the problem occurrence common tree.

The analyzing unit 16 extracts management data 101 of the system A in which the problem has ever arisen and management data 102 of the system B in which the problem has also ever arisen from the data storage unit 3 on the basis of the identification numbers described in the problem occurrence list, and compares the management data 101 with the management data 102.

As a result of the comparison between the management and another management data, the analyzing unit 16 extracts "Machine:X series", "CPU:X cpu", "OS:X OS", "Soft:Y package" as a configuration in common with the system A and the system B. Note that the respective items of the management data are given in a format such as (Configuration Type: Data Value) in FIG. 20. For instance, "Machine", "CPU", "OS" are the configuration types, while "X series", "X cpu", "X OS" are the data values.

A schema 103, as illustrated in FIG. 20, defines the dependency relation between the configurations by way of the tree structure. Then, the analyzing unit 16 sets, according to the definition of the schema 103, the data values of the management data in the node having the configuration associated with the data values, and deletes the nodes having none of the associated data values, thus generating a problem occurrence common tree 104. To be specific, the analyzing unit 16 sets "X cpu" in the node of "CPU", sets "X series" in the node of "Machine", and sets "X OS" in the node of "OS". Further, the analyzing unit 16 deletes the nodes of "MEM", "OS ver" having none of the associated data values from the schema 103.

Figure 22:
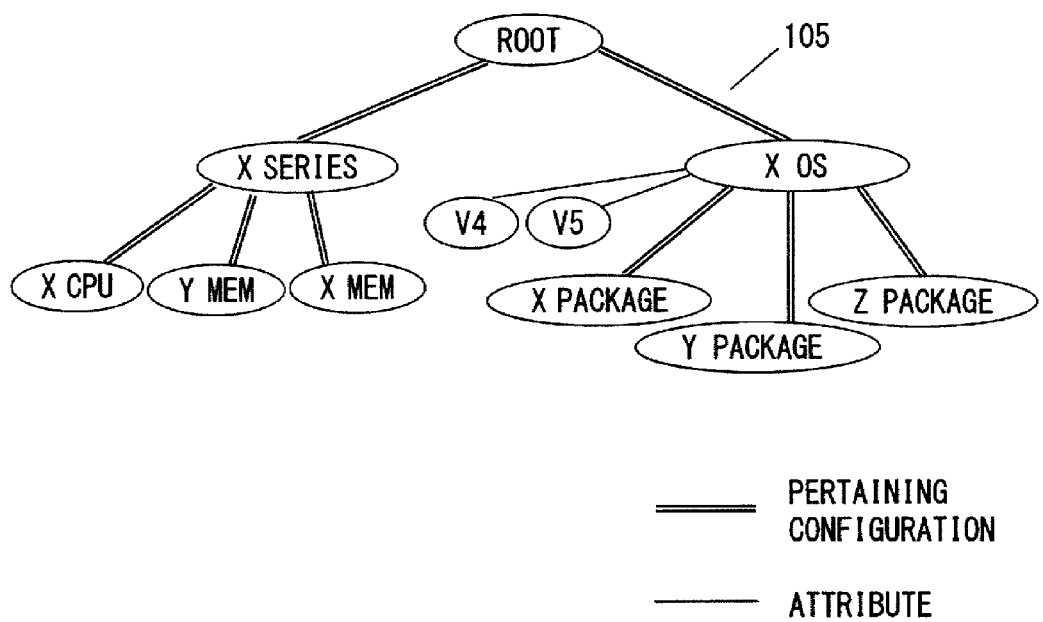
FIG. 22 is a diagram illustrating one example of a problem occurrence tree.

Note that the schema 103 is enabled to specify the dependency relation between the nodes by having, e.g., as depicted in FIG. 21, a configuration type, a data value and a pointer list of pointers each pointing the child node and can therefore define the tree structures depicted in FIGS. 20 and 22. The configuration types are pieces of information representing the configurations such as "Machine" and "OS" becoming the nodes of the tree structure, and the pointer list for pointing the child nodes defines addresses of memory areas stored with the data of the child nodes. FIG. 21 illustrates an example of the addresses of the three child nodes dependent on the node of "OS"

Next, the analyzing unit 16 generates a problem occurrence tree by mapping, to the single tree structure according to the schema, all items of management information of the systems in which the problem extracted from the data storage unit 3 has ever arisen (S47).

FIG. 22 illustrates an example of the problem occurrence tree. A problem occurrence tree 105 is different from the problem occurrence common tree 104 in that the data mapped to the tree structure are not narrowed down by the common points, while the schema 103 and the management data are the same. The analyzing unit 16 extracts, based on the identification numbers described in the problem occurrence list, the management data 101 of the system A in which the problem has ever arisen and the management data 102 of the system B in which the problem has ever arisen from the data storage unit 3, and maps all the data to the tree structure according to the schema 103 without narrowing down the data. As depicted in FIG. 22, in the problem occurrence tree, the data are not be narrowed down with the common points, and hence, as in the case of "Y mem" and "X mem", there can exist the plurality of nodes that are different in their data values but the same in their data types.

Furthermore, the analyzing unit 16 extracts, from the data storage unit 3, the management data associated with the identification numbers not described in the problem occurrence list generated in S44, i.e., the identifying information of the systems with non-occurrence of the problem. Moreover, the analyzing unit 16 generates a problem non-occurrence tree by mapping all pieces of management information of the systems with non-occurrence of the problem to the single tree structure according to the schema 103 (S48).

Then, the comparing unit 15 extracts differences meaningful to the analysis of the problem, i.e., characteristics of a system with the occurrence of the problem by comparing the problem occurrence common tree, the problem occurrence tree and the problem non-occurrence tree with each other, and adds the differences or the characteristics as the analysis result to the list described above (S49).

The comparing unit 15 of the manager 10 determines one node serving as an origin when searching for the characteristics by comparing the nodes, and goes on extracting the differences between the child nodes under the origin node. The search along the tree structure starts from the root node of the problem occurrence common tree and proceeds toward leaves thereof. An algorithm related to a search sequence is not particularly restricted. For example, typical search techniques such as the Breadth First Search and the Depth First Search are employed. The comparing unit 15, based on a predetermined algorithm, advances the search for the nodes shared by any two tree structures among the problem occurrence common tree, the problem occurrence tree and the problem non-occurrence tree, and extracts the differences existing at a further point thereof as the characteristics.

Figure 23:
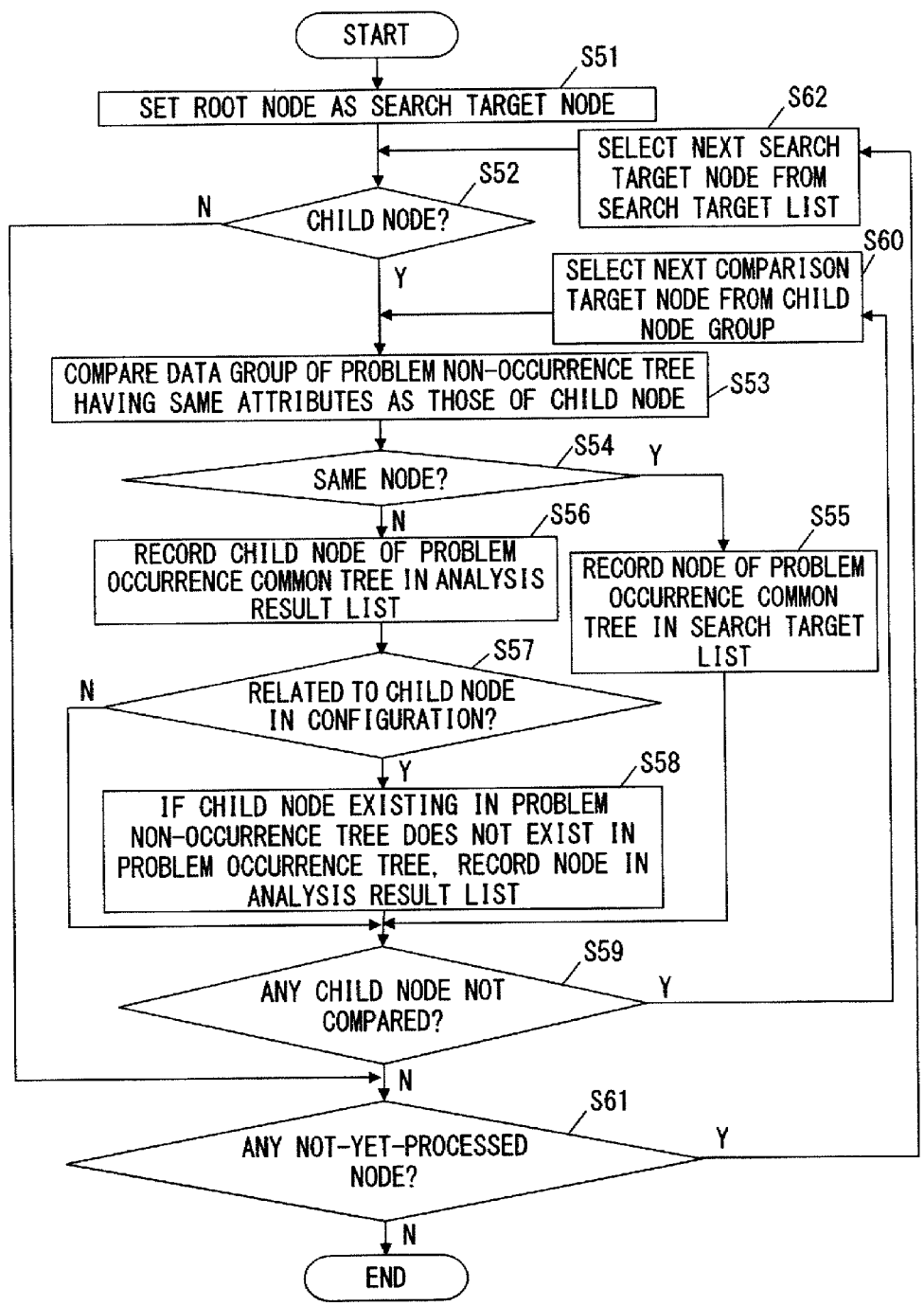
FIG. 23 is an explanatory diagram of a process of extracting characteristics of the system with the occurrence of the problem.

FIG. 23 is an explanatory diagram of a process, which is executed in S49 of FIG. 19, to extract the characteristics of the systems with the occurrence of the problem.

The comparing unit 15 at first sets the root node of the problem occurrence common tree as the node serving as the origin for the search, i.e., a search target node (S51).

The comparing unit 15 determines whether the search target node has the child nodes or not (S52).

If the search target node has the child nodes (S52; Yes), the comparing unit 15 sets one node among a child node group under the search target node of the problem occurrence common tree as a target node for the comparison, i.e., a comparison target node, and compares the comparison target node with the same type of node group existing in the problem non-occurrence tree (S53).

The comparing unit 15 determines, as a result of the comparison, whether or not the node having the same data values as those of the comparison target node exists in the problem non-occurrence tree (S54) and, if the node having the same data values is detected (S54; Yes), records this node in a list for selecting the search target node from the next time onward, i.e., the search target list (S55).

Whereas if the node having the same data values is not detected from the problem non-occurrence tree (S54; No), the comparing unit 15 records such a comparison target node that the child node, i.e., the node having the same data values (as those of the comparison target node) is not detected from the problem non-occurrence tree, in the analysis result list as the characteristic of the system with the occurrence of the problem (S56).

Next, the comparing unit 15 determines whether or not the child nodes of the problem non-occurrence tree set as the comparison target in S53 have the configuration related to the parent node (S57). In the case of the configuration which relates the child nodes of the problem non-occurrence tree to the parent node, the comparing unit 15 makes the search as to whether the problem occurrence tree contains the existence of the node which coincides in terms of data values with the child node of the problem non-occurrence tree. Then, the comparing unit 15, if the problem occurrence tree does not contain the existence of the node which coincides in terms of data values with the child node of the problem non-occurrence tree, records a characteristic such as "the system with occurrence of the problem does not include any child nodes of the problem non-occurrence tree" in the analysis result list (S58).

Figure 24:
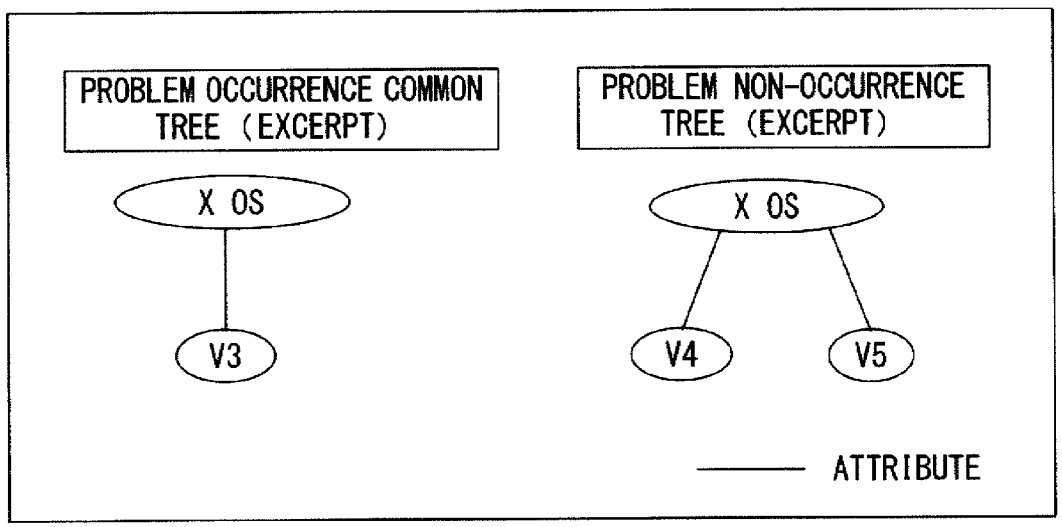
FIG. 24 is an explanatory diagram of an attribute node.

Herein, the targets for the comparison with the problem occurrence tree are the child nodes determined to have the configuration related to the parent node of the problem non-occurrence tree in S57, while the node of the attribute is not set as the comparison target node with the problem occurrence tree. The reason why so is that in the case of extracting the attribute node of the same data type as the characteristic, it is meaningful that the attribute node is a common node among all of the systems with the occurrence of the problem, and the items of information on other attribute nodes are unnecessary. For example, to exemplify FIG. 24 in which the OS version number is set as the data type of the comparison target, in the problem occurrence common tree, the nodes are narrowed down by the data shared by the systems with the occurrence of the problem, and hence there is one single node representing the version number. While on the other hand, the problem non-occurrence tree is generated from all items of data of the systems with non-occurrence of the problem. In the example of FIG. 24, if "V3" existing in the problem occurrence common tree is extracted as the characteristic of the system with the occurrence of the problem, this becomes sufficient information. Even when extracting characteristics such as "not V4", "not V5" in addition to "V3", the data become redundant.

If the child nodes have none of the configuration related to the parent node in S57 (S57; No), or after executing the processes in S55 and S58, the comparing unit 15 determines whether or not the child nodes not yet compared with the nodes of the problem non-occurrence tree exist under the search target node of the problem occurrence common tree (S59). If the not-yet-compared child nodes exist (S59; Yes), the comparing unit 15 selects the next child node (S60) and returns to S53 in which to repeat the comparison process.

Then, when determining that the not-yet-compared child nodes do not exist (S59; No) and when determining that there is no child node (S52; No), the comparing unit 15 determines whether or not the search target list contains the search target node not undergoing the processes from S52 onward (S61). If there is the search target node not undergoing the processes from S52 onward (S61; Yes), the next search target node is selected from the search target list, and the comparing unit 15 returns to S52. Then if there is none of the search target node not undergoing the processes from S52 onward (S61; No), the comparing unit 15 finishes the search process.

Working Examples

Figure 26:
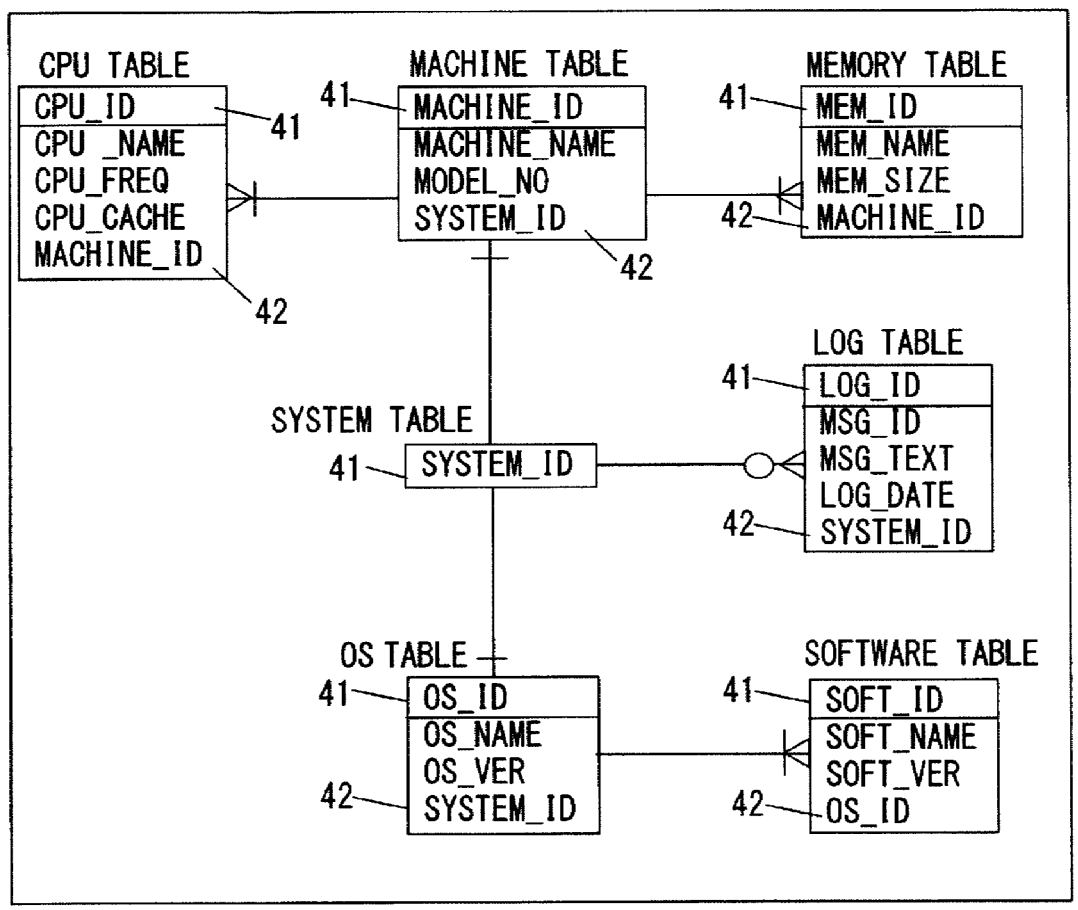
FIG. 26 is an explanatory diagram of a schema.

Given herein is an example in which the data format retained in the data storage unit 3 of the manager 10 is realized by a relational database. FIG. 26 illustrates an example in which a data schema 130 is expressed by an Information Engineering formatted ER diagram (entity-relationship diagram).

Respective tables are a table stored with the data representing the configuration included in the system, i.e., the configuration data and a table stored with the log data. For instance, there are a System table stored with configuration information (System ID) specifying the system, a Machine table stored with the configuration information specifying the equipment (Machine) such as the computer, a CPU table stored with the configuration information specifying the CPU, a Memory table stored with the configuration information specifying the memory, and OS table stored with the configuration information specifying the OS, a Software table stored with the configuration information specifying the software, and a Log table stored with the logs. Each item of configuration data stored in these tables contains an ID as a primary key 41 for distinction from other items of configuration data. For example, a Machine_ID of the Machine table is the identifying information for distinguishing the data of the Machine attached with the Machine_ID from the data of other Machines, and Machine_ID is the identifying information for identifying the parent node of the CPU and the memory as well as being the information for specifying the dependency relation. Each table can contain, other than the primary key, attributes of a configuration which is modeled by the table, for example, Machine_Name and Model_No in the Machine table. Further, each of the tables of the nodes other than the root node contains a configuration element related to the configuration which is modeled by the table, i.e., an external key 42 specifying the parent node in the present working example. For instance, the System table does not contain the external key 42, which indicates the root node, and the Machine table is stored with System_ID, thereby indicating that Machine is a component of the System.

Further, the Log table is the table for representing the log data, in which the information system that outputs the log can be specified by System_ID. The log collecting unit 311 of the agent previously retains System_ID transmitted from the manager when the belonging system is registered in the manager 10 as a management target of the manager 10, and writes System_ID to the Log table. The log collecting unit 311 of the agent monitors the log of the belonging system and, when a new log is output from the system, transmits the log data to the manager 10 in the format designated by the schema. The manager 10 accumulates and retains the log data received from the agent.

An available mode is that the manager 10 acquires the configuration data by periodically polling, however, in the present working example, the hardware information collecting unit 312 and the software information collecting unit 313 of the agent are to transmit the configuration data to the manager 10. The agent accesses the OS and the firmware, thereby acquiring the configuration data of the management target system. Then, if a change occurs in the monitored system information, the configuration data containing the change is transmitted to the manager 10.

The manager 10 overwrites the existing data within the data storage unit 3 with the configuration data received from the agent. If capable of sufficiently ensuring a capacity of the data storage unit 3, however, it is also feasible to take plural items of configuration data in time-series out of one system by accumulating and retaining the received data. Thus, many items of sampling data can be set as the target data when performing the data analysis by retaining the plural items of configuration data, and therefore an improvement of reliability on the analysis results can be expected.

The administrator recognizes the problem arising in the management target system from on a log reference screen as in FIG. 2, which is displayed by the client 20. Then, the administrator selects the data analysis target log from within the log list and executes a command to display the characteristics of the system with the occurrence of the problem, at which time the client 20 transmits the request for analyzing the system concerned to the manager 10.

The data analysis by the analyzing unit 16 of the manager 10 can be realized by making use of the arithmetic operation of the relational database.

The extraction of the system in which the problem has ever arisen involves executing the following SQL sentences.

SELECT DISTINCT System_ID FROM Log
WHERE Log_ID=<Log_I D of log selected by the administrator>

Herein, the analyzing unit 16 saves an execution result of the SQL sentence in a cache table named TROUBLE_SYSTEMS.

The extraction of the system in which the problem has never arisen involves executing the following SQL sentences.
SELECT System_ID FROM System
WHERE System_ID NOT IN
(SELECT System_ID FROM TROUBLE_SYSTEMS)

Herein, the analyzing unit 16 saves an execution result of the SQL sentences in a cache table named NON_TROUBLE_SYSTEMS.

Next, the analyzing unit 16, in order to generate the problem occurrence common tree, the problem occurrence tree and the problem non-occurrence tree, generates a system list, i.e., a list of the configurations included in the systems by connecting the tables other than the Log table. Herein, the SQL sentence is exemplified in the case of connecting the System table, the OS table and the Software table, however, actually the analyzing unit 16 connects all of the tables excluding the Log table in the same formula.

SELECT System.System_ID, OS_Name, OS_Ver,
Soft_Name, Soft_Ver FROM System, OS, Software
WHERE System.System_ID=OS.System_ID AND OS.OS_ID=Software.OS_ID The analyzing unit 16 saves the system list obtained herein in a cache table named SYSTEM_LIST.

The problem occurrence tree can be obtained by extracting the systems having the System IDs stored in TROUBLE_SYSTEMS from the system list SYSTEM_LIST, i.e., by extracting the systems with the occurrence of the problem.

SELECT*FROM SYSTEM_LIST

WHERE System_ID IN (SELECT System_ID FROM TROUBLE_SYSTEMS)

The analyzing unit 16 saves, in a cache table named TROUBLE_SYSTEM_TREE, the configuration data specifying the configurations included in the problem occurrence tree obtained as a result of executing the SQL sentences described above, i.e., the configuration data specifying the configurations included in the systems with the occurrence of the problem, the primary key 41 representing the dependency relation therebetween and the external key 42.

The problem occurrence common tree can be generated by extracting, if the type of the configuration data is saved on a column-by-column basis of the cache table TROUBLE_SYSTEM_TREE of the problem occurrence tree, the configuration data in which one type of elements are given in the column of the table, i.e., the configuration data of the configuration shared by all of the systems with the occurrence of the problem, i.e., the configuration data in which only one type of elements are saved in TROUBLE_SYSTEM_TREE. The analyzing unit 16 can check based on the following SQL sentence whether the elements of the column are of one type or not. In this working example, a type number of OS_Name can be examined.
SELECT COUNT(DISTINCT OS_Name) FROM TROUBLE_SYSTEM_TREE If the result indicates "1", the analyzing unit 16 sets a result obtained by the following SQL sentence as a component of the problem occurrence common tree.

SELECT DISTINCT OS_Name FROM TROUBLE_SYSTEM_TREE

The analyzing unit 16 can generate the problem occurrence common tree from the result obtained by executing the same formula with respect to each column of TROUBLE_SYSTEM_TREE.

The problem non-occurrence tree can be acquired by extracting the systems having the System IDs not stored in TROUBLE_SYSTEMS, i.e., the systems in which the problem has never arisen from the system list SYSTEM_LIST.

SELECT*FROM SYSTEM_LIST

WHERE System_ID IN (SELECT System_ID FROM NON_TROUBLE_SYSTEMS)

Figure 27:
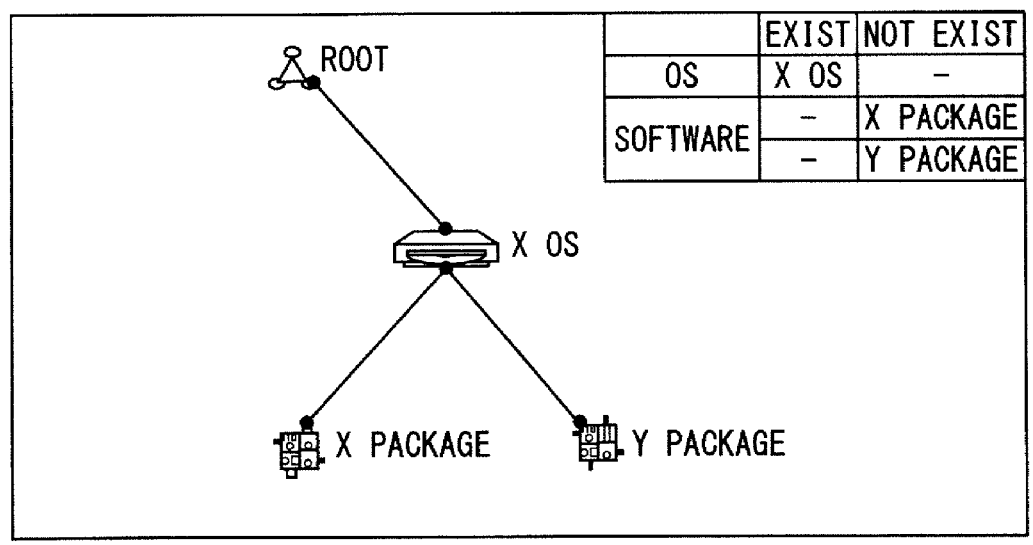
FIG. 27 is a diagram illustrating a display example of the analysis result.

Based on the data acquired from the above, the characteristics of the systems with the occurrence of the problem can be extracted in the procedure illustrated in FIG. 23. FIG. 27 illustrates an example of a result screen displayed to the administrator by the client 20 receiving the characteristics of the systems with the occurrence of the problem. In the example of FIG. 27, the characteristics of the systems with the occurrence of the problem are given on the assumption that "X OS" is installed as the OS, and "X package" and "Y package" are not held as the software.

As described above, according to the first embodiment, it is feasible to provide the technology of easily extracting the characteristics of the systems with the occurrence of the problem.

In particular, according to the first embodiment, there is extracted the difference between the system having the similarity to the system with the occurrence of the problem but not causing any problem and the system with the occurrence of the problem, and it is therefore feasible to extract the difference having the high possibility of contributing to detect the cause. Hence, even a little-experienced administrator gets easy to specify the cause of the problem.

Note that in the first embodiment, as depicted in FIG. 23, the difference of the child nodes of the search target node, i.e., the difference of the subordinate configurations (child nodes), each of which is subordinate to the configuration (search node) common between the problem occurrence common tree and the problem non-occurrence tree, is extracted as the characteristic. Herein, the subordinate configuration (child node) may, without being limited to what is used only for the common configuration (search node), also be a general-purpose configuration etc. that can be arbitrarily added by the user if the dependency relation therebetween is defined by the schema.

<Others>

The operation management device is not limited to only the illustrated examples given above but can be, as a matter of course, changed in a variety of forms within the scope that does not deviate from the gist of the present invention.

For example, the above-mentioned operation management software, client program and agent program may also be recorded on a computer-readable recording medium.

Herein, the computer-readable recording medium connotes a recording medium capable of accumulating information such as data, programs, etc. electrically, magnetically, optically, mechanically or by chemical action, which can be read from the computer. Among these recording mediums, for example, a flexible disc, a magneto-optic disc, a CD-ROM, a CD-R/W, a DVD, a DAT, an 8 mm tape, a memory card, etc. are given as those removable from the computer.

Further, a hard disc, a ROM (Read-Only Memory), etc. are given as the recording mediums fixed within the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An operation management device, comprising:
a processor to receive management data of elements provided in a plurality of management target devices, to obtain a dependency relation of problematic data defined as data of devices with occurrence of the problem in the received management data according to definition information which defines a dependency relation between the elements, to obtain a dependency relation of non-problematic data defined as data of the devices with non-occurrence of the problem in the received management data according to the definition information, to obtain management data of a common element by comparing the problematic data with the non-problematic data and to extract a difference between the problematic data and the non-problematic data with respect to management data of elements dependent on the common element.

2. The operation management device according to claim 1, wherein the processor classifies the management data of the elements in common with all of the devices with the occurrence of plural problems into problematic common data and extracts a difference between the problematic common data and the non-problematic data by comparing the problematic common data with the non-problematic data.

3. The operation management device according to claim 1, wherein the processor extracts the management data, existing in the non-problematic data without existing in the problematic data, of the elements dependent on the common element.

4. An operation management method, comprising:
receiving, by using the processor, management data of elements provided in a plurality of management target devices;
obtaining, by using the processor, a dependency relation of problematic data defined as data of devices with occurrence of the problem in the received management data according to definition information which defines a dependency relation between the elements and obtaining a dependency relation of non-problematic data defined as data of the devices with non-occurrence of the problem in the received management data according to the definition information;
obtaining, by using the processor, management data of a common element by comparing the problematic data with the non-problematic data; and
extracting, by using the processor, a difference between the problematic data and the non-problematic data with respect to management data of elements dependent on the common element.

5. The operation management method according to claim 4, wherein the method further comprises:
classifying, by using the processor, the management data of the elements in common with all of the devices with the occurrence of the problem in the plurality of management target devices into problematic common data, and
extracting, by using the processor, a difference between the problematic common data and the non-problematic data by comparing the problematic common data with the non-problematic data.

6. The operation management method according to claim 4, wherein the method further comprises
extracting, by using the processor, the management data, existing in the non-problematic data without existing in the problematic data, of the elements dependent on the common element.

7. A non-transitory computer readable medium storing an operation management program executed by a computer, the operation management program comprising computer-executable instructions to perform:
receiving management data of elements provided in a plurality of management target devices;
obtaining a dependency relation of problematic data defined as data of devices with occurrence of the problem in the received management data according to definition information which defines a dependency relation between the elements and obtaining a dependency relation of non-problematic data defined as data of the devices with non-occurrence of the problem in the received management data according to the definition information;
obtaining management data of a common element by comparing the problematic data with the non-problematic data; and
extracting a difference between the problematic data and the non-problematic data with respect to management data of elements dependent on the common element.

8. The non-transitory computer readable medium according to claim 7, the operation management program comprising computer-executable instructions to further perform:
classifying the management data of the elements in common with all of the devices with the occurrence of the problem in the plurality of management target devices into problematic common data, and
extracting a difference between the problematic common data and the non-problematic data by comparing the problematic common data with the non-problematic data.

9. The non-transitory computer readable medium according to claim 7, the operation management program comprising computer-executable instructions to further perform:
extracting the management data, existing in the non-problematic data without existing in the problematic data, of the elements dependent on the common element.

* * * * *